US012762973B2

(12) United States Patent
Boone et al.

(10) Patent No.: US 12,762,973 B2
(45) Date of Patent: Oct. 13, 2026

(54) MACHINE LEARNING MODEL-BASED SIGN LANGUAGE CORRECTIVE FEEDBACK

(71) Applicant: NVIDIA Corporation, Santa Clara, CA (US)

(72) Inventors: Michael Ross Boone, Los Gatos, CA (US); Ruthie D. Lyle, Durham, NC (US); Nikki Pope, Henderson, NV (US); David Lee Martin, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 19/044,244

(22) Filed: Feb. 3, 2025

(65) Prior Publication Data

US 2026/0229144 A1 Aug. 6, 2026

(51) Int. Cl.

| | |
|---|---|
| ***G09B 21/00*** | (2006.01) |
| ***G06F 16/53*** | (2019.01) |
| ***G06V 10/772*** | (2022.01) |
| ***G06V 20/40*** | (2022.01) |

(Continued)

(52) U.S. Cl.

CPC ........... *G09B 21/009* (2013.01); *G06F 16/53* (2019.01); *G06V 10/772* (2022.01); *G06V 20/41* (2022.01); *G06V 20/46* (2022.01); *G06V 40/28* (2022.01); *G09B 5/02* (2013.01)

(58) Field of Classification Search

CPC .............................. G06V 40/28; G09B 21/009

See application file for complete search history.

(56) References Cited

U.S. PATENT DOCUMENTS

| | | | | |
|---|---|---|---|---|
| 2008/0163130 A1* | 7/2008 | Westerman | ......... | G06F 3/04883 715/863 |
| 2020/0338745 A1* | 10/2020 | Adiletta | .................. | B25J 9/104 |

(Continued)

OTHER PUBLICATIONS

Alsharif, B., "Study Uses AI To Interpret American Sign Language In Real Time", Florida Atlantic University, 2024, 5 pages.

(Continued)

*Primary Examiner* — Robert J Utama

(74) *Attorney, Agent, or Firm* — SHOOK, HARDY & BACON L.L.P.

(57) ABSTRACT

In various examples, machine learning model-based sign language corrective feedback is provided. Machine learning model-based recognition of sign language symbols (e.g., body poses and/or movements) may be used to generate real-time kinematic feedback to a sign language speaker that guides them to adjust their hand pose to correctly align with established sign language standard symbols. A sign language feedback framework may process video data representing conversational sign language symbol sequences to extract kinematic keypoints to search a sign language dictionary representing an established vocabulary of sign language symbols. Based on selecting an intended sign language symbol from the dictionary and computing deviations between the kinematic keypoint pattern of the intended sign language symbol from the dictionary and the extracted kinematic keypoint symbol, the sign language feedback framework may provide real-time kinematic feedback to the signer describing how to adjust their signing.

20 Claims, 8 Drawing Sheets

(51) Int. Cl.

| | |
|---|---|
| ***G06V 40/20*** | (2022.01) |
| ***G09B 5/02*** | (2006.01) |

(56) References Cited

U.S. PATENT DOCUMENTS

| | | | | |
|---|---|---|---|---|
| 2023/0101696 | A1* | 3/2023 | Banerjee ................ | G06V 40/28<br>434/112 |
| 2024/0161651 | A1* | 5/2024 | Watson ..................... | G06F 3/16 |
| 2025/0218223 | A1* | 7/2025 | Zargari Khuzani ... | G06V 40/28 |

OTHER PUBLICATIONS

Anonymous, “The American Sign Language Avatar Project At DePaul University”, DePaul University, Available at: <http://asl.cs.depaul.edu/> Accessed Nov. 22, 2024, 1 page.
Jadhav et al., “Sign Language Recognition Using Neural Network”, KCCEMSR, Computer Science, vol. 1, 2020, 12 pages.
Pathan et al., “Sign language recognition using the fusion of image and hand landmarks through multi-headed convolutional neural network”, Scientific Reports, vol. 13, Retracted by the publisher on Jan. 8, 2025, 11 pages.
Snow : “Animated Signing Characters (Signing avatars)”, Available at : <https://snow.idrc.ocadu.ca/assistive-technology-2/augmentative-processing/animated-signing-characters-signing-avatars/>, Accessed Nov. 22, 2024, 5 pages.
Heitz et al., “Iterative α-(de) Blending: a Minimalist Deterministic Diffusion Model”, SIGGRAPH ’23 Conference Proceedings, May 5, 2023, 10 pages.
Microsoft, “How to Use American Sign Language (ASL) Avatars in Clipchamp”, Available online at: <https://support.microsoft.com/en-us/topic/how-to-use-american-sign-language-asl-avatars-in-clipchamp-493e2fe4-c8b9-430c-9246-1f3043af83c0>, Accessed on Dec. 24, 2025, 9 pages.
Microsoft, “Use Sign Language Mode in Microsoft Teams Meetings”, Available online at: <https://support.microsoft.com/en-us/topic/use-sign-language-mode-in-microsoft-teams-meetings-8f88ed08-5a5e-41db-a190-e0b30cab58ca#:~:text=To%20enable%20Sign%20Language%20View,then%20turn%20on%20Sign%20Language>, Accessed on Dec. 24, 2025, 5 pages.
Omnibridge, “Sorenson OmniBridge”, Available online at: <https://omnibridge.ai/>, Accessed on Dec. 24, 2025, 5 pages.
U.S. Appl. No. 19/038,118, Title: Machine Learning Model-Based Customized Real-Time Sign Language Translation, filed Jan. 27, 2025, 69 pages.

* cited by examiner

MACHINE LEARNING MODEL-BASED SIGN LANGUAGE CORRECTIVE FEEDBACK

BACKGROUND

Sign languages are natural languages that have been developed to use a visual-manual modality to convey meaning. In contrast to spoken languages that rely on auditory signals such as sounds and spoken messages, sign languages utilize hand shapes, movements, facial expressions, and body postures to convey information. Sign languages have their own unique grammar and syntax (which can differ significantly from the spoken languages of the same region) and may be influenced by various factors including cultural and regional variations. They provide a means of communication for individuals with varying degrees of deafness, but also play a role in the cultural identity and community cohesion for those individuals and their support communities. Learning a particular version of a sign language, such as American Sign Language for example, can be approached through various methods and resources. Formal classes may be offered by community colleges, universities, or various organizations, and Internet-based courses and video tutorials provide flexibility and accessibility for learners.

SUMMARY

Embodiments of the present disclosure relate to machine learning model-based sign language corrective feedback. Systems and methods are disclosed that provide real-time kinematic feedback to a signer illustrating how they may adjust their signing.

In contrast to conventional systems, embodiments of the present disclosure are directed to technologies that use machine learning model-based recognition of conversational sign language symbols (e.g., body poses including hand shapes, curvatures and/or movements) to generate real-time kinematic feedback to a sign language speaker (referred to herein as a signer) that guides them to adjust their hand pose (e.g., position and/or movements of hands and fingers) to correctly align with established sign language standard symbols (e.g., from an authoritative sign language dictionary). In some embodiments, a communications platform may comprise a sign language feedback framework that includes one or more machine learning models and that processes video data representing conversational sign language symbol sequences performed by a signer. The one or more machine learning models may be trained to perform human body pose recognition, such as skeletal kinematic recognition that extracts the relative positions of predefined kinematic keypoints (e.g., skeletal bones, joints, and/or other features) from one or more images of an individual's hand(s), arm(s), face, and/or torso. The sign language feedback framework may detect and/or extract from the video data the relative positions of predefined kinematic keypoints as exhibited by the signer to establish a two-dimensional kinematic keypoint symbol. Such an extracted kinematic keypoint symbol may provide a pattern of kinematic keypoints that may be used to query a search of a sign language dictionary (e.g., a database) representing an established vocabulary of conversational sign language symbols. The sign language feedback framework may execute a similarity algorithm that computes one or more alignment metrics that correlate the extracted kinematic keypoint symbol to those kinematic keypoint symbols that may be found in the sign language dictionary. The similarity algorithm may select as the signer's intended sign language symbol the kinematic keypoint pattern from the sign language dictionary having the greatest similarity to the extracted kinematic keypoint symbol. Based on selecting the intended sign language symbol from the dictionary, and computing deviations between the kinematic keypoint pattern of the intended sign language symbol from the dictionary and the extracted kinematic keypoint symbol, the sign language feedback framework may provide real-time kinematic feedback to the signer describing how to adjust their signing (e.g., how to adjust the alignment of their hands and/or fingers) to improve their signing technical proficiency.

BRIEF DESCRIPTION OF THE DRAWINGS

The present systems and methods for machine learning model-based sign language corrective feedback are described in detail below with reference to the attached drawing figures, wherein.

DETAILED DESCRIPTION

Figure 1:
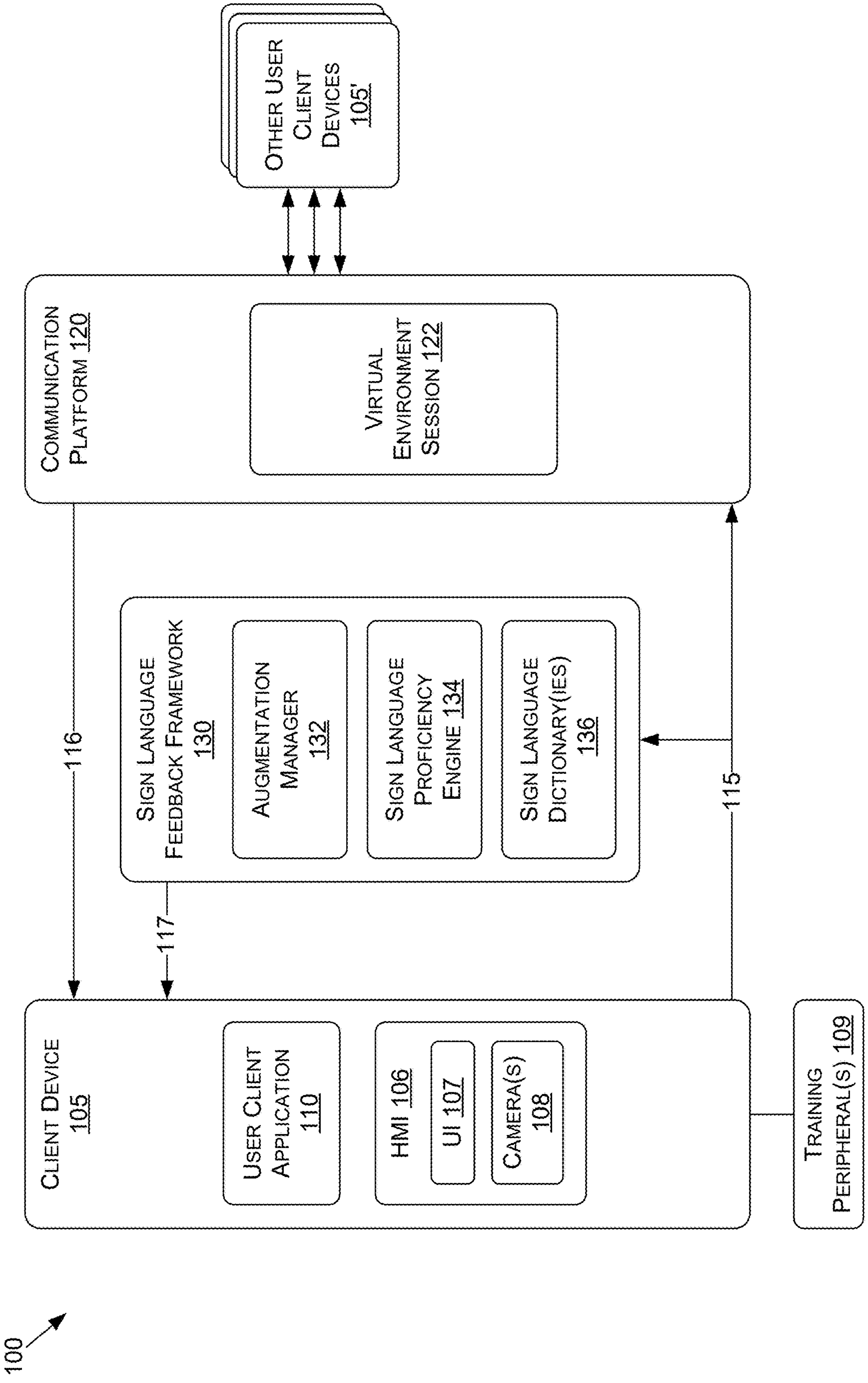
FIG. 1 is a data flow diagram for an example process for a sign language-based communication system, in accordance with some embodiments of the present disclosure.

Systems and methods are disclosed related to machine learning model-based sign language corrective feedback. Learning to communicate in a sign language involves both learning to recognize hand shapes, movements, and facial expressions, and developing the corresponding manual skills of reproducing hand shapes and movements with sufficient proficiency that they can be recognized by others as conveying a sign language message. Mastering sign language skills is often best achieved by consistent practice and exposure to the language in real-life contexts. Current technology-based solutions that facilitate learning of sign language are typically directed at cloud-based tutorial platforms and/or applications where sequences of conversational sign language symbols (and/or alphabetic sign language symbols) may be presented on a display and a user attempts to learn to understand the presented sign language content, for example based on closed caption text translations. By using these technologies, a user may learn to follow sign language content, and may develop a rudimentary skill set for forming conversational sign language symbols with their own hands by mimicking what they have viewed. That said, the user is left to self-assess their own abilities with respect to how well they are accurately reproducing conversational sign language symbols, which has a substantial impact on how well they will be able to convey their thoughts to others using sign language. With that in mind, forms of sign language recognition technologies based on convolutional neural network (CNN) models have been proposed. However, those technologies have been substantially directed at classification of fingerspelling images rather than generating a true translation of conversational sign language symbol sequences. Moreover, such sign language recognition technologies as currently proposed are limited in dynamic contexts of real-life sign language conversations where malformed sign language symbols may result in ambiguity or misunderstanding from the perspective of the recipient.

In contrast to current technologies for supporting sign language communications, embodiments of the present disclosure are directed to technologies that use machine learning model-based recognition of conversational sign language symbols (e.g., hand shapes, body poses, curvatures, and/or movements) to generate real-time kinematic feedback to a sign language speaker (referred to herein as a signer) that guides them to adjust their body pose (e.g., position and/or movements of hands and fingers) to correctly align with established sign language standard symbols (e.g., from an authoritative sign language dictionary). In some embodiments, they may be guided to adjust facial expressions. As further discussed herein, it should be understood that sign language symbols may include static symbols (e.g., where a pose is held in a position) and temporal symbols (e.g., involving movement and/or changes in pose over time).

For example, in some embodiments, a communications platform may comprise a sign language feedback framework that includes one or more machine learning models and that processes video data representing conversational sign language symbol sequences performed by a signer. The one or more machine learning models may be trained to perform human body pose recognition, such as skeletal kinematic recognition that extracts the relative positions of predefined kinematic keypoints (e.g., skeletal bones, joints, and/or other features) from images of an individual's hand(s), arm(s), face and/or torso. The sign language feedback framework may detect and/or extract from the video data the relative positions of predefined kinematic keypoints as exhibited by the signer to establish a two-dimensional kinematic keypoint symbol. Such an extracted kinematic keypoint symbol may provide a pattern of kinematic keypoints that may be used to query a search of a sign language dictionary (e.g., a database) representing an established vocabulary of conversational sign language symbols. For example, the sign language feedback framework may execute a similarity algorithm that computes one or more alignment metrics that correlate the extracted kinematic keypoint symbol to those kinematic keypoint symbols that may be found in the sign language dictionary. As mentioned above, it should be understood that in some embodiments, one or more of the kinematic keypoint symbols for conversational sign language symbols defined in the sign language dictionary may be static in nature (e.g., representing a static hand and/or body pose) and/or temporal in nature (e.g., representing hand motion patterns as opposed to, or in addition to, strictly static hand poses). The similarity algorithm may select as the signer's intended sign language symbol the kinematic keypoint pattern from the sign language dictionary having the greatest similarity to the extracted kinematic keypoint symbol. Based on selecting the intended sign language symbol from the dictionary, and computing deviations between the kinematic keypoint pattern of the intended sign language symbol from the dictionary and the extracted kinematic keypoint symbol, the sign language feedback framework may provide real-time kinematic feedback to the signer describing how to adjust their signing (e.g., how to adjust the alignment of their hands and/or fingers) to improve their signing technical proficiency.

In some embodiments, a sign language feedback framework may generate animated kinematic feedback (e.g., real-time and/or near real-time animated visual feedback) to the signer by presenting, for example, a kinematic keypoint pattern overlay or similar graphic that highlights kinematic keypoints that deviate in position from the dictionary-defined kinematic keypoint pattern by more than a threshold amount. For example, the sign language feedback framework may determine bounding shapes (e.g., bounding boxes) around detected keypoints and compute variations to determine when keypoints extracted from the video data are beyond an established tolerance. The sign language feedback framework may further determine a correction (e.g., a direction and/or distance) indicating how an out-of-tolerance keypoint should be adjusted to align the signer's hand pose into a more correct representation of the intended sign language symbol. For example, the real-time kinematic feedback may display an arrow or other graphic showing how the signer could move (e.g., adjust their hand(s), finger(s), arm(s), torso, and/or facial expression) to better align the symbol they are presenting with the intended sign language symbol. In some embodiments, the real-time kinematic feedback may display visual correction feedback for a plurality of distinct keypoints, where out-of-tolerance keypoints are distinctly highlighted in real-time with indications on how to improve their alignment. For example, in some embodiments, the real-time kinematic feedback may comprise a kinematic keypoint pattern overlay where out-of-tolerance keypoints are readily distinguishable from in-tolerance keypoints, such as by different colors and/or other indicators. The kinematic keypoint pattern overlay may comprise an animated representation of the kinematic keypoint pattern that is dynamically updated. For example, the locations of kinematic keypoints of the pattern may be dynamically adjusted to follow the signer's changing hand pose. In some embodiments, the real-time kinematic feedback may present a kinematic keypoint pattern overlay where in-tolerance keypoints are displayed using a first color (e.g., green) and out-of-tolerance keypoints are displayed using a second color (e.g., red). As the signer adjusts their hand pose based on the displayed graphical guidance, those out-of-tolerance keypoints that become aligned within tolerance may change in color (e.g., from red to green) to provide positive reinforcement to the signer that they are correctly adjusting their hand pose. Should adjustments made by the signer cause a previously in-tolerance keypoint to become out-of-tolerance, then that keypoint may change in color (e.g., from green to red) to provide feedback to the signer that their attempts to correct their hand pose have created further misalignments from the intended sign language symbol.

Although the real-time kinematic feedback to the signer has been described as comprising a graphical overlay, it should be appreciated that using an overlay is discussed in order to provide a non-limiting example of real-time kinematic feedback and that in other embodiments, other forms of real-time kinematic feedback may be used. For example, in some embodiments, the real-time kinematic feedback may comprise an augmentation (e.g., modification) of a real-time video feed of the signer that is modified (e.g., using a generative artificial intelligence (AI) model) to alter the signer's hand pose to illustrate deviations between the kinematic keypoint pattern of the intended sign language symbol and the extracted kinematic keypoint symbol. That is, the kinematic feedback may comprise real-time video feedback showing the signer how their hand pose should be adjusted using modified images of the signers hands, and may illustrate the deviations between their actual hand pose and the target hand pose that would place their extracted keypoints within tolerance to match the intended sign language symbol selected from the dictionary. In some embodiments, the real-time kinematic feedback may comprise an augmented and/or extended reality presentation that displays a combination of generative AI hand pose modifications and a keypoint pattern overlay.

In some embodiments, a sign language dictionary may be selected from a plurality of different sign language dictionaries to reconfigure the sign language feedback framework for different versions of sign language. That is, while American Sign Language (ASL) is a prevailing language used by hearing-impaired individuals in the United States, British Sign Language (BSL), Spanish Sign Language (SSL), Japanese Sign Language (JSL), and French Sign Language (LSF) are each examples of distinct sign languages having their own vocabularies and grammar rules. In some embodiments, a sign language dictionary for a particular sign language version may be loaded into memory and accessed by the sign language feedback framework in order to provide a signer with real-time kinematic feedback corresponding to the sign language version being used by the signer. In some embodiments, the sign language feedback framework may access different sign language dictionaries from a library of available sign language dictionaries to adjust the sign language feedback framework for a particular version of sign language. In some embodiments, the sign language feedback framework may evaluate an input video feed that captures a signer. The signer may register their sign language user preference with the sign language feedback framework by signing in the sign language of their preference. The sign language feedback framework may detect the sign language version being used by the signer (e.g., using a machine learning model trained to infer and classify sign language versions), and use that determination to establish the sign language version preferences of the signer.

In some embodiments, a sign language feedback framework may comprise and/or access one or more language models (e.g., tiny language models (TLMs), small language models (SLMs), large language models (LLMs), etc.) and/or retrieval-augmented generation (RAG) artificial intelligence models. Such a RAG model may be used to implement, at least in part, a sign language dictionary used for determining a kinematic keypoint pattern representing a signer's intended sign language symbol based on an extracted kinematic keypoint symbol. A RAG model may access one or more data sources as authoritative knowledge to augment training-based data sources when generating responses to input prompts. Accordingly, in some embodiments, the sign language feedback framework may comprise a RAG model that accesses a data source comprising one or more authoritative sign language dictionaries. The sign language feedback framework may input a prompt to the RAG model based on an extracted kinematic keypoint symbol, and in response, the RAG model may select a kinematic keypoint pattern identified from the one or more authoritative sign language dictionaries as being similar to the extracted kinematic keypoint symbol. In some embodiments, based on video data capturing the signer's hand pose and the kinematic keypoint pattern identified by the RAG model, the sign language feedback framework may generate a response indicating deviations between the kinematic keypoint pattern of the intended sign language symbol and the extracted kinematic keypoint symbol from the signer. The sign language feedback framework may then provide real-time kinematic feedback to the signer describing how to adjust their signing (e.g., how to adjust the alignment of their hands and/or fingers) to conform to the intended sign language symbol. In one or more embodiments, the RAG model may be configured to use a data source comprising a sign language dictionary corresponding to the sign language version used by the signer. For example, the RAG model may select sign language dictionaries corresponding to a sign language version based on a sign language user preference indication.

In some embodiments, a sign language feedback framework as described herein may be implemented at least in part as a plug-in or module software component of an application executed locally on a signer's computing device (e.g., a user computing device such as a desktop computer, laptop, tablet computer, smartphone, or other computing devices). As non-limiting examples, such applications may comprise a client application for a communication platform, a sign language training application, or a precision hand pose training application for another skill. In some embodiments, the sign language feedback framework may be implemented at least in part as a service (e.g., a microservice) exposed from a networked cloud computing platform (e.g., hosted at least in part by data center 700). For example, in some embodiments, one or more functions of a sign language feedback framework, such as one or more machine learning models providing one or more of sign language detection and/or translation functions, and/or generating real-time kinematic feedback (e.g., overlays and/or modified video feeds), may be accessed as services by a client application using, for example, application programming interface (API) function calls, hypertext transfer protocol (HTTP) control channels, and/or a WebRTC sender and receiver client for audio, video, and/or text data. In some embodiments, the sign language feedback framework functionality may be implemented as a selectable service of an underlying video conferencing communication platform (e.g., as an NVIDIA® Maxine-provided functionality) and/or implemented as network applications by one or more servers of a communication platform. In some embodiments, the sign language feedback framework functionality may be distributed across the client application, exposed network services, and/or network applications hosted by one or more servers. For example, a client application may comprise a front end of the sign language feedback framework that communicates and interfaces with a user interface on the speaker's device, and that communicates with a back end that comprises the computing hardware resources to execute the machine learning models of the sign language feedback framework and/or generate real-time kinematic feedback data that is communicated back to the front end for presentation on the user interface. Moreover, one or more of the sign language dictionaries may be hosted and accessed from one or more cloud-based computing platforms.

In some embodiments, the one or more models of the sign language feedback framework may be executed by a variety of different neural network architectures. For example, one or more models may comprise machine learning model architectures (e.g., one or more encoder-decoder-based machine learning models, CNN models, deep neural network (DNN) models, LLM-based models, generative AI models, etc.) trained to perform operations such as, but not limited to, sign language symbol detection, hand pose detection, skeletal kinematic recognition, kinematic keypoint pattern detection and/or extraction and/or to instantiate and control graphical overlays for real-time kinematic feedback. In some embodiments, the sign language feedback framework may be implemented using an artificial intelligence (AI)-based software framework (e.g., a suite of cloud-hosted AI models) such as, but not limited to, NVIDIA's Tokkio. In some embodiments, a sign language feedback framework may comprise a first communication channel-processing path to process a video stream feed that captures representations of a signer as captured by one or more image sensors. The sign language feedback framework may comprise a second communication channel-processing path to process outgoing real-time kinematic feedback data for presentation to a user interface of a client application.

In some embodiments, the sign language feedback framework described herein may be more generally implemented as a pose feedback framework for use in other use case applications that can benefit from a user learning to align their body pose to an established standard. For example, a pose feedback framework may reference one or more sign language-based body pose dictionaries that include one or more standardized kinematic keypoint patterns, where the pose feedback framework applies a query based on an extracted kinematic keypoint symbol from video data to find a similar (e.g., the most similar) kinematic keypoint pattern, and real-time kinematic feedback generated describing how a user may adjust their hand pose and/or body pose to conform to an intended pose. Such use cases may include body pose dictionaries associated with playing a musical instrument (e.g., correct hand positions for the piano, guitar, violin, etc.), sports (e.g., proper grip and stance for tennis, golf, baseball, etc.) or other tasks where obtaining a precision hand pose is involved in successfully completing a task. Such sign language and/or body pose feedback frameworks improve the ability of the underlying technology to more efficiently and effectively achieve their task of presenting training content.

With reference to FIG. 1, FIG. 1 is an example data flow diagram for a process for a sign language-based communication system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by one or more processors comprising processing circuitry and executing instructions stored in memory.

As shown in FIG. 1, the sign language-based communication system 100 may comprise one or more client devices 105 that couple to a communication platform 120 to instantiate one or more virtual communications channels. One or more functions and/or components of the sign language-based communication system 100 described herein may be realized at least in part using a computing device, such as computing device 600 shown in FIG. 6, and/or resources of a data center, such as data center 700 described with respect to FIG. 7. The communication platform 120 may comprise, as non-limiting examples, a conferencing service (e.g., Microsoft Teams, Zoom, Cisco Webex, GoToMeeting, and the like), a cloud-based collaborative content creation platform (e.g., NVIDIA Omniverse, or other multiuser virtual environments), a peer-to-peer communications system, and/or other platforms supporting real-time audio/video communications between the client device 105 and one or more other user client devices 105' (e.g., which may be operated by human users and/or virtual users such as, but not limited to, artificial intelligence (AI)-based users). In some embodiments, one or more users may individually access the communication platform 120 (e.g., via a networked connection) through respective client applications of their respective client devices (e.g., client device 105 and other client devices 105'), such as but not limited to the computing device 600 shown in FIG. 6.

As a non-limiting example, in some embodiments the communication platform 120 may comprise a collaborative platform through which client devices 105 and 105' may exchange audio-visual content within the context of a virtual environment session 122 (e.g., a virtual conference or meeting, a virtual reality space (e.g., a metaverse in which users represented by avatars may interact) or another virtual environment (e.g., NVIDIA Omniverse) hosted by the communication platform 120. Generally, when the communication platform 120 initiates a conferencing meeting (e.g., a "call"), it may establish an instance of the virtual environment session 122. The virtual environment session 122 defines a channel or other shared logical infrastructure that carries audio, video, text, and/or other forms of communications between a plurality of user participants who are attendees to the virtual environment session 122. In such embodiments, one or more user client applications 110 used to access the virtual environment session 122 may comprise, for example, a stand-alone application (e.g., a Microsoft Teams, Apple FaceTime, or other application), or a web browser application (e.g., Microsoft Edge, Safari, etc.) that accesses the virtual environment session 122 via a web server (HTTP) protocol.

As shown in FIG. 1, the client device 105 may comprise a human-machine interface 106 through which a user may interact with the user client application(s) 110. For example, the HMI 106 may comprise one or more of a keyboard, pointing device, touchscreen, microphone, and/or other input interfaces for providing inputs to the user client application 110, and/or a display screen, speaker(s), and/or other output interfaces for providing content to the user from the user client application 110. In some embodiments, the client device 105 and/or HMI 106 may comprise one or more cameras 108 that capture image data of the user for uplink transmission to the communication platform 120 as uplink content data feed 115. The uplink content data feed 115 may comprise audio and/or video data captured from the user of user client application 110. That is, an uplink content data feed 115 may comprise communications content data that includes, amongst other data, video data representing sign language communications (e.g., content data generated by a user signing in a sign language)—which may be distributed via the communication platform 120, for example, to the one or more other user client device(s) 105'. The user client application 110 may control the HMI 106 to display at least one user interface (UI) 107 to display content received via downlink content data feed 116 obtained via the communication platform 120 from other users.

The user client application 110 may also control the UI 107 to display a representation of kinematic feedback data 117 generated by at least one sign language feedback framework 130. The sign language feedback framework 130 may comprise a generative artificial intelligence-based augmentation manager 132 and one or more machine language model-based sign language proficiency engines 134. In some embodiments, the sign language feedback framework 130 may include, and/or have access to, one or more body pose-based sign language dictionaries 136 used by the sign language proficiency engines 134 to evaluate sign language communications included in the uplink content data feed 115.

Figure 3A:
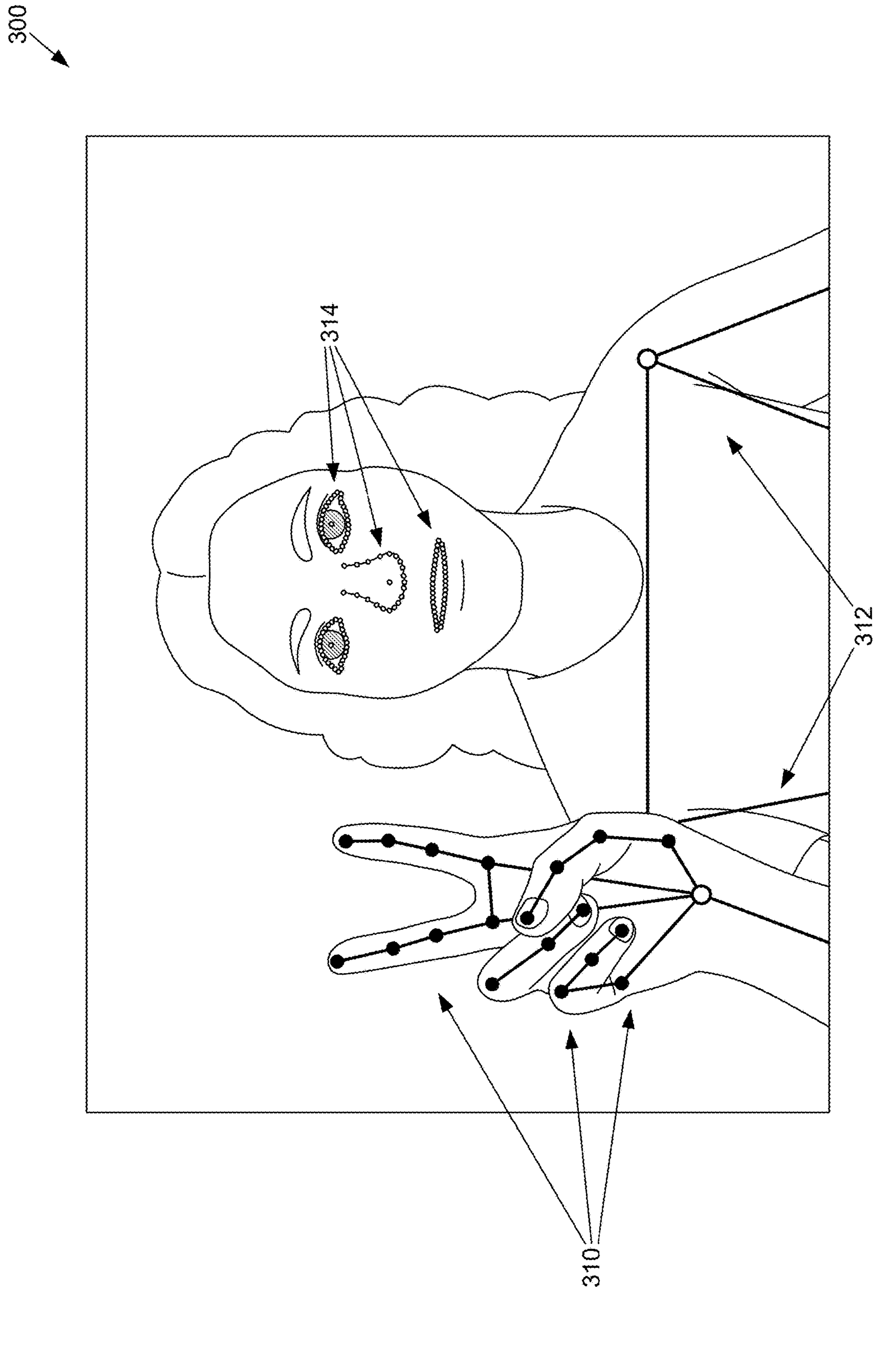
FIGS. 3A and 3B are diagrams illustrating an example of the evaluation of sign language communications to provide real-time kinematic feedback, in accordance with some embodiments of the present disclosure.
Figure 3B:
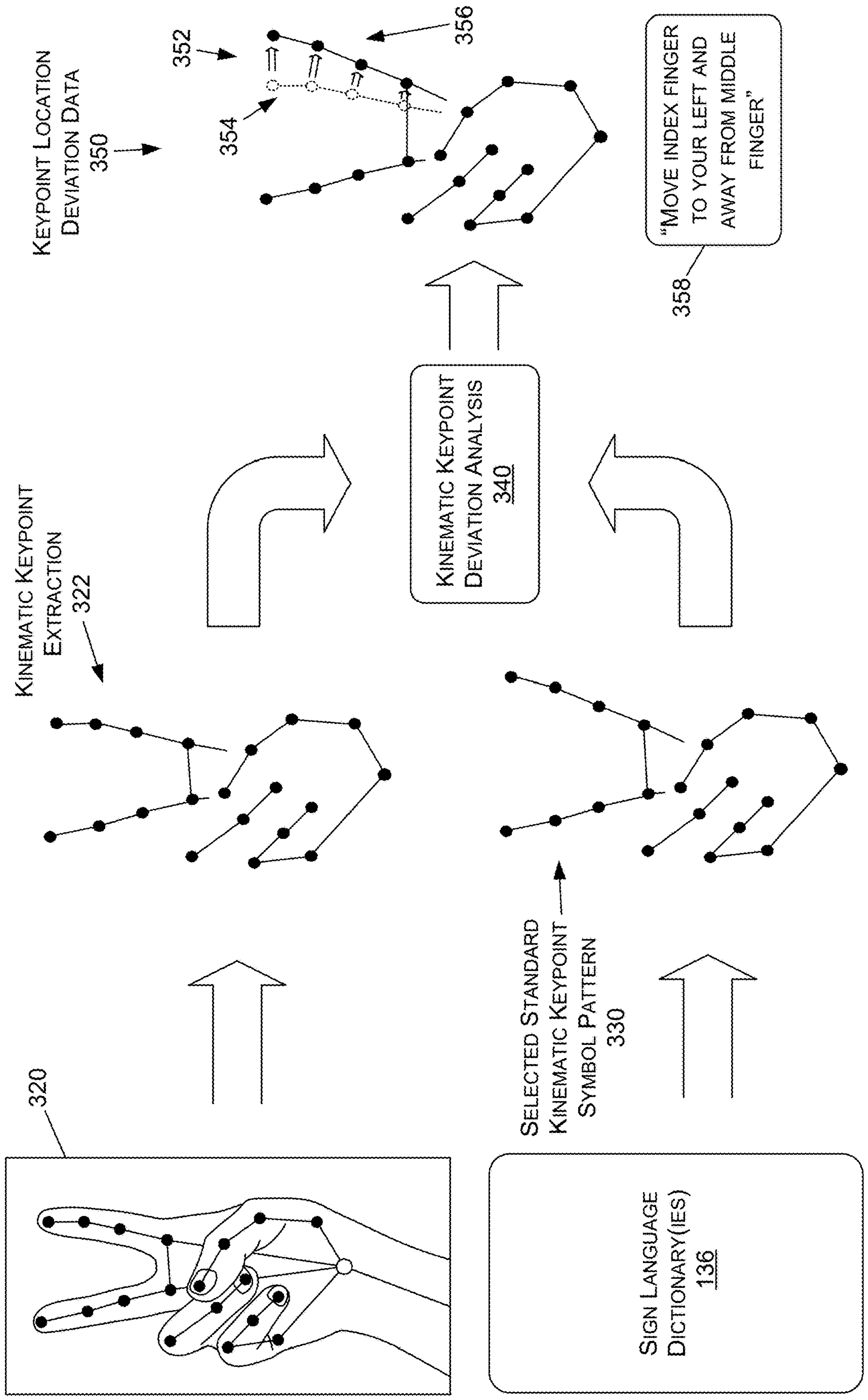

As described herein, and in more detail with respect to FIGS. 3A and 3B, the sign language feedback framework 130 may evaluate the sign language communications provided by the uplink content data feed 115 to provide kinematic feedback data 117 (e.g., animated kinematic feedback data providing visual feedback) via the UI 107 to the signer describing how to adjust their signing (e.g., how to adjust the pose of their hands and/or body) to improve their signing technical proficiency. In some embodiments, the sign language feedback framework 130 may instantiate at least one sign language proficiency engine instance 134 based on video data from the uplink content data feed 115 by detecting whether the uplink content data feed 115 includes sign language data, and if so, which sign language is being used. Based on detecting a sign language, the sign language proficiency engine instance 134 may extract kinematic keypoint location patterns from the video data to define one or more sign language body pose kinematic keypoint symbols (e.g., where sign language symbols may include static symbols where a pose is held in a position and/or temporal symbols involving movement and/or changes in a pose over time). The sign language proficiency engine instance 134 may compute one or more kinematic keypoint location deviations between the one or more sign language body pose kinematic keypoint symbols extracted from the video data and standardized kinematic keypoint patterns obtained from the one or more sign language dictionaries 136. The generative artificial intelligence-based augmentation manager 132 may input the kinematic keypoint location deviation data from the sign language proficiency engine instance 134 to compute the kinematic feedback data 117 that represents one or more human body pose adjustments. As discussed herein, the kinematic feedback data 117 may indicate one or more human body pose adjustments that would bring the extracted sign language body pose kinematic keypoint symbols into conformance (e.g., based on similarity within a similarity threshold) with the standardized kinematic keypoint pattern obtained from one or more sign language dictionaries 136. The user client application 110 may then receive the kinematic feedback data 117 and control the user interface 107 to output a visual presentation based on the kinematic feedback data 117.

Figure 2:
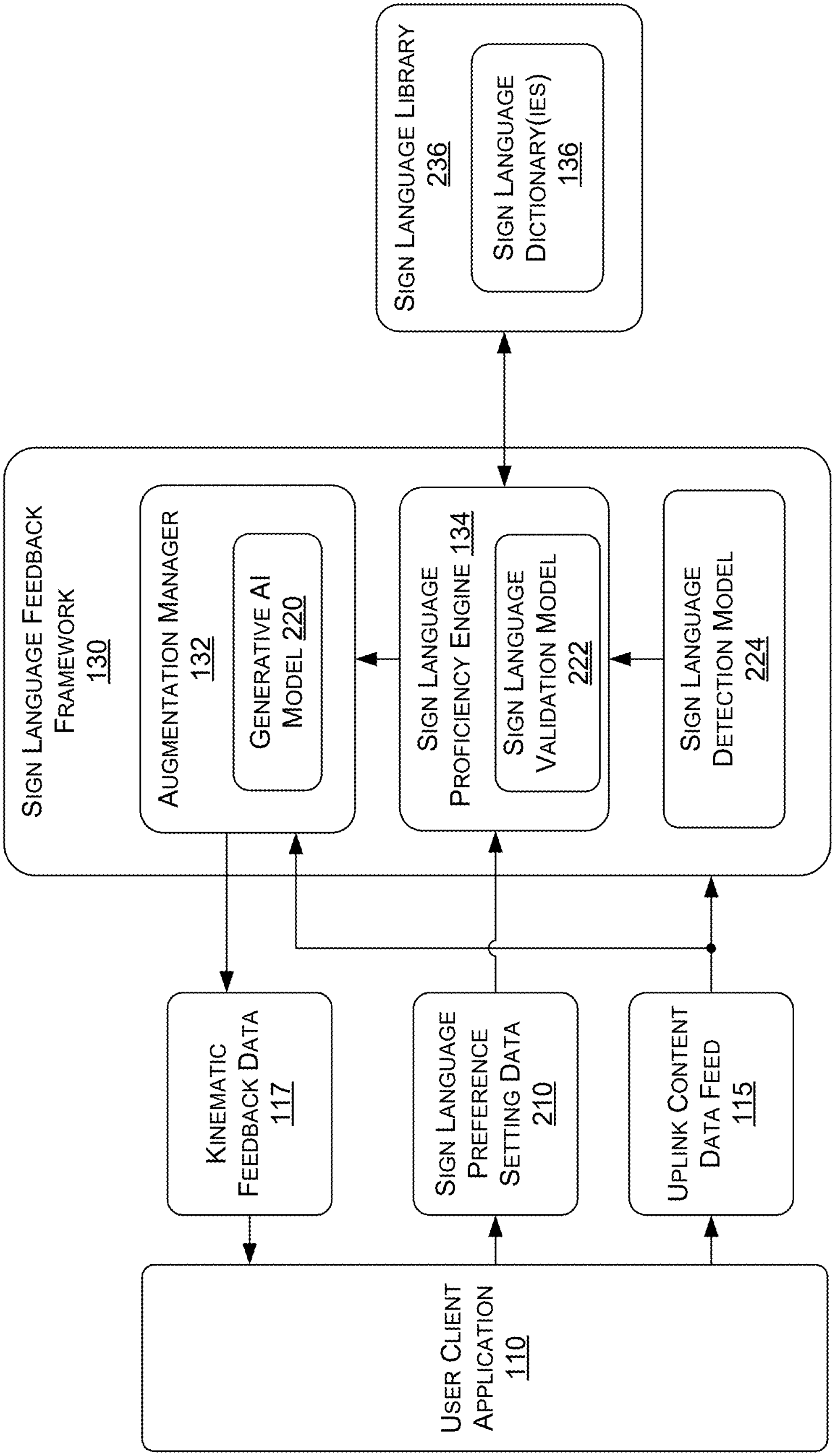
FIG. 2 is a data flow diagram illustrating an example sign language feedback framework, in accordance with some embodiments of the present disclosure.

Referring now to FIG. 2, FIG. 2 is a data flow diagram illustrating an example sign language feedback framework 130, in accordance with some embodiments of the present disclosure. As discussed with respect to FIG. 1, the sign language feedback framework 130 may process sign language content within uplink content data feed 115 to produce kinematic feedback data 117. In some embodiments, the sign language feedback framework 130 may detect or otherwise determine the particular sign language appearing in uplink content data feed 115 in order to configure the sign language proficiency engine instance 134 and/or for selecting one or more corresponding sign language dictionaries 136 that may be used by the sign language proficiency engine instance 134 (e.g., to look up standardized kinematic keypoint patterns). In some embodiments, sign language proficiency engine instance 134 may input an indication of sign language preference setting data 210 received from the user client application 110. For example, the user of user client application 110 may set a sign language user preference indicating a preferred sign language they will use for signing. The sign language proficiency engine instance 134 may input the sign language user preference and access one or more sign language dictionaries 136 that it will use to generate keypoint location deviation data (representing deviations between kinematic keypoint symbols extracted from the video data and standardized kinematic keypoint patterns obtained from the one or more sign language dictionaries 136). For example, in some embodiments, the sign language preference setting data 210 may indicate a selection of a preferred sign language (e.g., ASL). In that case, the sign language feedback framework 130 may initialize (e.g., instantiate) the one or more sign language translation engine instances 134 with a target sign language mode configuration that generates keypoint location deviation data representing a signer's compliance, or lack thereof, to that selected preferred sign language (e.g., ASL).

As another example, in some embodiments, a sign language feedback framework 130 may infer the sign language user preference based on processing uplink content data feed 115 received from the user client application 110. For example, the sign language feedback framework 130 comprises a sign language detection model 224 comprising a machine learning model trained to infer from video data when a sign language is being used and classify which sign language is being used. Based on the sign language detection model 224 determining when a sign language is being used and which sign language is being used, the sign language feedback framework 130 may instantiate the one or more sign language translation engine instances 134 with a target sign language mode configuration for that preferred sign language (e.g., to access the corresponding sign language dictionaries 136). In some embodiments, a corresponding sign language dictionary 136 may be selected from a sign language library 236 comprising a plurality of sign language dictionaries 136 defining standard sign language kinematic keypoint symbols for various different sign languages. The sign language library 236 may be part of or separate from the sign language feedback framework 130.

The sign language proficiency engine instance 134 may comprise one or more machine learning models trained to perform human body pose recognition such as skeletal kinematic recognition that extracts the relative positions of predefined kinematic keypoints (e.g., skeletal bones and joints and/or other features) from one or more images of an individual's hand(s), arm(s), face, and/or torso. The sign language proficiency engine instance 134 may detect and/or extract from the uplink content data feed 115 video data of the relative positions of predefined kinematic keypoints as exhibited by the signer to establish a two-dimensional kinematic keypoint symbol, such as is illustrated in FIG. 3A. For example, FIG. 3A illustrates an example of a two-dimensional kinematic keypoint symbol 300 based on a human body pose that includes kinematic keypoints for a hand pose (shown at 310), kinematic keypoints for a torso pose (shown at 312), and/or kinematic keypoints for a facial pose (shown at 314). The sign language proficiency engine instance 134 may extract one or more keypoints of such a human body pose to determine a holistic two-dimensional kinematic keypoint symbol that may be indicative of a pattern conveying sign language-based information. As mentioned herein, the two-dimensional kinematic keypoint symbol determined by the sign language proficiency engine instance 134 may be a static symbol (e.g., a static human body pose that can be determined from an image frame), and/or the two-dimensional kinematic keypoint symbol determined by the sign language proficiency engine instance 134 may be a temporal symbol (e.g., a moving human body pose determined from a sequence of image frames). The kinematic keypoint symbol extracted from a captured human body pose may be used by the sign language proficiency engine instance 134 as a query to search a sign language dictionary 136 to find a corresponding standard version of the sign language symbol that may be used as a basis for comparison to the extracted kinematic keypoint symbol to produce the kinematic keypoint location deviation data. In some embodiments, the sign language proficiency engine instance 134 may perform the search of sign language dictionary 136 based on executing a similarity algorithm. For example, the similarity algorithm may select a kinematic keypoint pattern from the sign language dictionary 136 that has a similarity (e.g., within a similarity threshold) to the extracted kinematic keypoint symbol and define that as representing the signer's intended sign language symbol. Based on this determination of the intended sign language symbol from a sign language dictionary 136, the sign language proficiency engine instance 134 computes deviations between the kinematic keypoint pattern of the intended sign language symbol and the extracted kinematic keypoint symbol. In some embodiments where the sign language dictionary 136 includes multiple variations of a sign language symbol, the similarity algorithm may select a kinematic keypoint pattern from the sign language dictionary 136 that has the closest similarity to the signer's apparent intended sign language symbol given the extracted kinematic keypoint symbol.

In some embodiments, the similarity algorithm may incorporate the use of contextual information to search the sign language dictionary 136 to determine a signer's intended sign language symbol. For example, even where a sign language symbol may be defined based on a hand pose and/or torso pose, the similarity algorithm may leverage facial keypoints to classify a facial expression (e.g., happy, sad, angry, confused, etc.) to help in discerning the intended sign language symbol and its corresponding standardized kinematic keypoint pattern from the sign language dictionary 136. For example, when a facial expression conveying happiness is detected, that detection may help the similarity algorithm to narrow its search to sign language symbols associated with happiness. In some embodiments, contextual information may include detected changes in facial landmarks (e.g., cheek puffs). For example, when a facial expression conveying happiness is detected, that detection may help the similarity algorithm to narrow its search to sign language symbols associated with happiness.

In some embodiments, the use of contextual information by the similarity algorithm may be sensitive to cultural differences. For example, the sign language dictionary 136 may include variations in facial expressions based on cultural differences that may be used to help in discerning the intended sign language symbol. Moreover, in some embodiments, the sign language proficiency engine instance 134 may monitor body language and emotion (e.g., as indicated by a detected body pose and/or facial expressions) and provide feedback to the signer (e.g., to the UI 107) when the observed body language and emotion does not appear to match the signer's apparent intended sign language symbol given the extracted kinematic keypoint symbol. In some embodiments, body language and emotion detection and classification may be performed by an emotion detection model (e.g., a machine learning model trained to extract emotion data based on kinematic keypoints and/or other factors). In some embodiments, emotion detection and classification performed by the sign language proficiency engine instance 134 may may also be configured to accommodate cultural differences in how various emotions may be expressed.

The sign language proficiency engine instance 134 then may generate keypoint location deviation data representing one or more deviations between the kinematic keypoint symbols extracted from the video data and standardized kinematic keypoint patterns obtained from the one or more sign language dictionaries 136. For example, as illustrated in FIG. 3B, the sign language proficiency engine instance 134 may process image data (shown at 320) to obtain an extracted kinematic keypoint symbol (shown at 322). Based on the extracted kinematic keypoint symbol, the sign language proficiency engine instance 134 searches one or more sign language dictionaries 136 to obtain a standard kinematic keypoint symbol (shown at 330) having a similarity to the extracted kinematic keypoint symbol 322 (e.g., within a similarity threshold), which the sign language proficiency engine instance 134 defines as representing the signer's intended sign language symbol. The sign language proficiency engine instance 134 may then perform a kinematic keypoint deviation analysis 340 to generate keypoint location deviation data 350. The keypoint location deviation data 350 may represent deviations in the location of keypoints in the extracted kinematic keypoint symbol 322 relative to where the keypoint locations should be located to produce the intended sign language symbol according to the one or more sign language dictionaries 136. In some embodiments, minor deviations (e.g., deviations less than a deviation threshold) may be disregarded. Those extracted keypoint locations that are offset from the standard keypoint locations (e.g., by more than the deviation threshold) may be indicated in deviation data 350. For example, the sign language proficiency engine instance 134 may determine bounding shapes (e.g., bounding boxes) around detected keypoints and compute variations to determine when keypoints extracted from the video data are deviating beyond an established tolerance.

In some embodiments, the keypoint location deviation data 350 may include a spatial representation of conforming versus non-conforming keypoint locations and/or may include adjustment data representing human body pose adjustments that may be made to bring non-conforming keypoints to their correct locations as defined by the one or more sign language dictionaries 136. For example, in FIG. 3B the deviation data 350 at 352 indicates that a set of kinematic keypoints associated with the signer's index finger are out of conformance, being too far to the right (shown at 354), and further indicates where those kinematic keypoints should be adjusted to (shown at 356) to properly align with the standard kinematic keypoint pattern 330. The deviation data 350 may further indicate what body pose adjustment needs to be applied to non-conforming keypoints to properly align them with the standard kinematic keypoint pattern 330. Moreover, in some embodiments, the sign language proficiency engine instance 134 may generate and include in deviation data 350 one or more textual instructions (shown at 358) indicating what pose adjustment needs to be applied by the speaker to bring the non-conforming keypoints into conformance.

The one or more sign language translation engine instances 134 may be implemented using one or more sign language validation machine learning models 222 that may comprise one or more different neural network architectures. For example, a sign language proficiency engine instance 134 may be implemented using a sign language validation machine learning model 222 that comprises one or more machine learning model architectures (e.g., encoder-decoder-based models) trained to perform sign language detection, body pose detection, and/or kinematic keypoint extraction, one or more generative artificial intelligence models (e.g., a small language model (SLM)-based model, an LLM-based model, etc.), and/or one or more retrieval-augmented generation (RAG) artificial intelligence models. The sign language validation machine learning models 222 may generate an output comprising the kinematic keypoint location deviation data based on the search a sign language dictionary 136 for the sign language symbol that may be used as a basis for comparison to the extracted kinematic keypoint symbol. A sign language proficiency engine instance 134 may include a sign language recognition software module that operates together with a dialogue manager (DM) software module and/or natural language processing artificial intelligence (AI). For example, a sign language proficiency engine may be implemented using NVIDIA Riva. In some embodiments, a sign language proficiency engine instance 134 may be implemented using a set of graphics processing unit (GPU)-accelerated multilingual speech recognition and translation microservices that include sign language neural machine translation services and in some embodiments, may produce prompts used to interface with one or more LLM(s) accessible to the sign language feedback framework 130 and/or to the one or more sign language translation engine instances 134.

Based on the keypoint location deviation data 350 generated by the sign language proficiency engine instance 134, the augmentation manager 132 may generate the kinematic feedback data 117 provided back to the user client application 110. The kinematic feedback data 117 may be used by the user client application 110 to present a visual representation of the keypoint location deviation data 350 onto the UI 107. The augmentation manager 132 may generate animated kinematic feedback (e.g., real-time and/or near real-time animated visual feedback) to the signer by presenting, for example, a kinematic keypoint pattern overlay or similar graphic that highlights kinematic keypoints that deviate in position from the dictionary-defined kinematic keypoint pattern by more than a threshold amount. The kinematic feedback data 117 may include a correction (e.g., a direction and/or distance) indicating how an out-of-tolerance keypoint should be adjusted to align the signer's hand pose into a more correct representation of the intended sign language symbol. For example, based on real-time kinematic feedback data 117, the user client application 110 may control the UI 107 to display an arrow or other graphic showing how the signer could move and adjust their body pose (e.g., adjust their hand(s), finger(s), arm(s), torso, and/or facial expression) to better align the sign language symbol they are presenting with the intended sign language symbol. In some embodiments, the UI 107 may display visual correction feedback for a plurality of distinct keypoints, where out-of-tolerance keypoints are distinctly highlighted in real-time with indications on how to improve their alignment.

For example, in some embodiments, based on the real-time kinematic feedback data 117, the UI 107 may display a kinematic keypoint pattern overlay where out-of-tolerance keypoints are readily distinguishable from in-tolerance keypoints, such as by different colors and/or other indicators. The kinematic keypoint pattern overlay may comprise an animated representation of the kinematic keypoint pattern that is dynamically updated. For example, the locations of kinematic keypoints of the pattern may be dynamically adjusted to follow the signer's changing hand pose. In some embodiments, the real-time kinematic feedback may present a kinematic keypoint pattern overlay where in-tolerance keypoints are displayed using a first color (e.g., green), and out-of-tolerance keypoints are displayed using a second color (e.g., red). As the signer adjusts their body and/or hand pose based on the displayed graphical guidance on the UI 107, those out-of-tolerance keypoints that become aligned within tolerance may change in color (e.g., from red to green) to provide positive reinforcement to the signer that they are correctly adjusting their hand pose. Should adjustments made by the signer cause a previously in-tolerance keypoint to become out-of-tolerance, then that keypoint may change in color (e.g., from green to red) to provide feedback to the signer that their attempts to correct their hand pose have created further misalignments from the intended sign language symbol.

In other embodiments, other forms of real-time kinematic feedback may be used. The augmentation manager 132 may receive the uplink content data feed 115 and generate video data that augments the video data from uplink content data feed 115 to generate the kinematic feedback data 117. For example, the augmentation manager 132 may generate a version of the uplink content data feed 115 that illustrates body pose adjustments and/or instructions for adjustments to guide the signer based on the kinematic feedback data 117. The real-time kinematic feedback data 117 may comprise an augmentation (e.g., modification) of the uplink content data feed 115 that is modified (e.g., using a generative artificial intelligence (AI) model) to alter the signer's hand pose to illustrate deviations between the kinematic keypoint pattern of the intended sign language symbol and the extracted kinematic keypoint symbol. That is, the kinematic feedback data 117 may comprise real-time video feedback showing the signer how their hand pose should be adjusted using modified images of the signer's hands, and may illustrate the deviations between their actual hand pose and the target hand pose that would place their extracted keypoints within tolerance to match the intended sign language symbol selected from the dictionary. In some embodiments, the kinematic feedback data 117 may comprise an augmented and/or extended reality presentation that displays a combination of generative AI hand pose modifications and a keypoint pattern overlay.

In some embodiments, the user client application 110 may use the kinematic feedback data 117 to control one or more training peripherals 109 in addition to, or instead of, UI 107. For example, a training peripheral 109 (e.g., coupled to or integrated with the client device 105) may comprise a robotic hand responsive to controls from the user client application 110 based on the kinematic feedback data 117 so that the robotic hand is able to provide the standard for correct signing. For example, a human user may rest their hand on the robotic hand (or alternatively the robotic hand could rest on the human hand) while the robotic hand adjusts in pose (e.g., hand and fingers) to provide the user with physical feedback to increase their sign language proficiency. The robot hand can subsequently provide feedback for a better signing technique, including manually manipulating the hand of the human, audio clues, etc.

As shown in FIG. 2, in some embodiments, the augmentation manager 132 may comprise one or more generative artificial intelligence models 220 (e.g., small language model (SLM)-based models, LLM-based models, video and/or audio generation models, an avatar manager (e.g., to instantiate and control an avatar), etc.) to generate the kinematic feedback data 117. For example, in some embodiments, the generative artificial intelligence model(s) 220 may input as prompts the keypoint location deviation data from the one or more instantiated sign language translation engine instances 134 to generate the kinematic feedback data 117 described herein. In some embodiments, the one or more models of the sign language feedback framework 130 may be implemented at least in part using an artificial intelligence (AI)-based software framework (e.g., a suite of cloud-hosted AI models) such as, but not limited to, NVIDIA's Tokkio.

In some embodiments, a sign language feedback framework 130 as described herein may be implemented as a plug-in or module component of the client application 110 and executed locally on the client device 105. In some embodiments, one or more functions of the sign language feedback framework 130 may be exposed to client application 110 as a cloud computing platform-based network service (e.g., a microservice). For example, in some embodiments, one or more functions of a sign language feedback framework 130, such as one or more sign language validation machine learning models 222 of the sign language proficiency engine instance 134, the generative AI model 220 of the augmentation manager 132, and/or sign language detection model 224, may be implemented as network services accessed by the client application 110 using, for example, application programming interface (API) function calls, HTTP control channels, and/or a WebRTC sender and receiver client for audio, video, and/or text data. In some embodiments, one or more aspects of sign language feedback framework 130 functionality may be implemented as a selectable service of the underlying communication platform 120 (e.g., as an NVIDIA® Maxine-provided functionality) and implemented as network applications by one or more servers of the communication platform 120. In some embodiments, the sign language feedback framework 130 functionality may be distributed across a client application, exposed network services, and/or network applications hosted by one or more servers. For example, a client application 110 may comprise a front end of the sign language feedback framework 130 that communicates and interfaces with the user interface 107, and that communicates with a back end that comprises the computing hardware resources to execute the sign language proficiency engine instance 134, augmentation manager 132, and/or sign language detection model 224.

Figure 4:
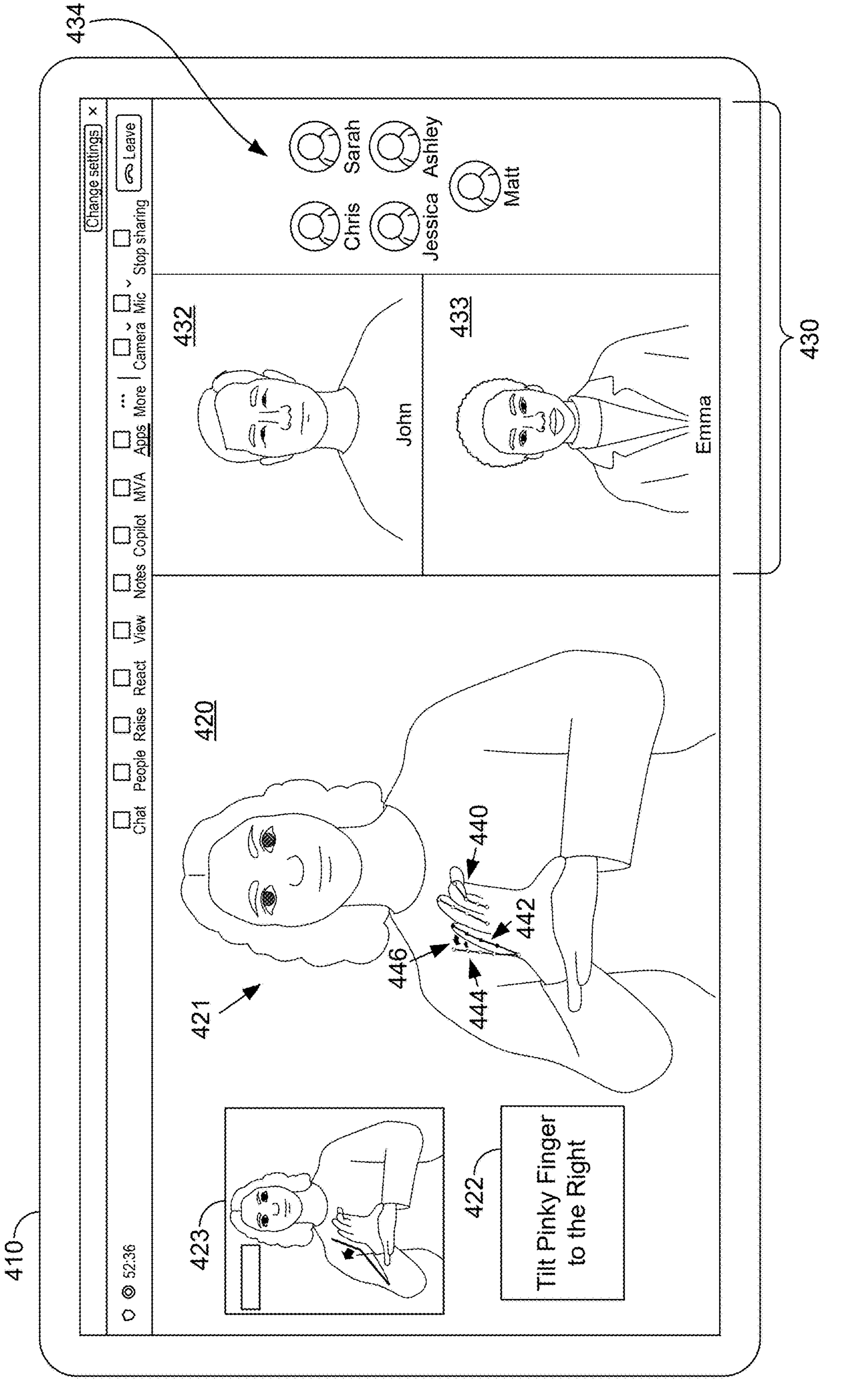
FIG. 4 is a diagram illustrating an example user interface of a client application used in conjunction with a sign language feedback framework, in accordance with some embodiments of the present disclosure.

Referring now to FIG. 4, FIG. 4 is a diagram illustrating an example user interface 410, such as a UI 107 generated and controlled by a user client application 110. In this example, UI 410 represents a UI for interacting with a video conferencing session (e.g., a video conference call) associated with the virtual environment session 122. In this example UI 410, the UI includes a sign language presenter feedback screen 420 presenting an augmented version of the uplink content data feed 115 that includes feedback to the presenter based on the kinematic feedback data 117 produced by the sign language feedback framework 130.

As shown in FIG. 4, the user interface 410 may also include a participant's region 430 that displays the other participants of a session. As described herein, the virtual environment session 122 includes the logical infrastructure established by the communication platform 120 to transport content data in real-time between the participants. As such, the UI 410 may be controlled to present the downlink content data feed 116 received from the other participants as individual content feeds, such as those shown at 432 and 433. In this example, a number of the user participants have elected to share their real-time local video feeds so that those participants are presented in the participant's region 430 as video using those real-time local video feeds, as shown by windows 432 and 433. Other user participants, represented at 434, have elected not to share real-time local video feeds and are instead presented in the participant's region 430 using still profile images or default images.

In some embodiments, the video of the presenting user displayed in sign language presenter feedback screen 420 may be produced based on kinematic feedback data 117 generated by a sign language feedback framework 130 and from the uplink content data feed 115 from the client application 110 of that presenting user. In this example, the user client application 110 may have set a sign language user preference indicating a sign language (e.g., ASL). As such, the sign language feedback framework 130 produces kinematic feedback data 117 that provides the presenter with adjustments to their signing to help them conform to the selected sign language.

As previously discussed, a language proficiency engine instance 134 may perform a kinematic keypoint deviation analysis 340 to generate keypoint location deviation data 350. The keypoint location deviation data 350 may represent deviations in the location of keypoints in the extracted kinematic keypoint symbol 322 relative to where the keypoint locations should be located to produce the intended sign language symbol according to the one or more sign language dictionaries 136. In some embodiments, minor deviations (e.g., deviations less than a deviation threshold) may be disregarded. Those extracted keypoint locations that are offset from the standard keypoint locations (e.g., by more than the deviation threshold) may be indicated in deviation data 350. The deviation data 350 may further indicate what adjustment needs to be applied to non-conforming keypoints to properly align them with the standard kinematic keypoint pattern 330. Moreover, in the embodiments, the sign language proficiency engine instance 134 may generate and include in deviation data 350 one or more textual instructions indicating what pose adjustment needs to be applied by the speaker to bring the non-conforming keypoints into conformance. Based on the keypoint location deviation data 350 generated by the sign language proficiency engine instance 134, the augmentation manager 132 may generate the kinematic feedback data 117 provided back to the user client application 110. The kinematic feedback data 117 may be used by the user client application 110 to present a visual representation of the keypoint location deviation data 350 within the sign language presenter feedback screen 420.

In some embodiments, the sign language presenter feedback screen 420 may present animated kinematic feedback (e.g., real-time and/or near real-time animated visual feedback) to the signer by presenting video data that augments the video data from uplink content data feed 115. The sign language presenter feedback screen 420 may present an AI-generated augmentation of the uplink content data feed 115 that illustrates body pose adjustments and/or instructions for adjustments to guide the signer based on the kinematic feedback data 117—such as an augmentation to the signer's hand pose to illustrate deviations between the kinematic keypoint pattern of the intended sign language symbol and the extracted kinematic keypoint symbol. That is, the sign language presenter feedback screen 420 may present animated feedback, such as in the form of real-time video, showing the signer how their body and/or hand pose should be adjusted using modified images that depict the signer, and may illustrate the deviations between their actual pose and the target pose that would place their extracted keypoints within tolerance to match the intended sign language symbol selected from the dictionary. For example, the sign language presenter feedback screen 420 at 421 displays a video image of the signer that is generated based on uplink content data feed 115. Based on the kinematic feedback data 117, the signer's image may be augmented to show extracted keypoints that conform to the standard kinematic keypoint pattern of the intended sign language symbol, as shown at 440. As shown at 442, the signer's image may be augmented to show extracted keypoints that do not conform with the standard kinematic keypoint pattern (shown at 442) and/or the location of where those keypoints should be located to obtain conformance with the standard kinematic keypoint pattern (shown at 444). In some embodiments, the signer's image may be augmented with further graphical cues (such as shown at 446) illustrating a direction and/or movement for an adjustment that may be performed by the signer to obtain a more correct representation of the intended sign language symbol. For example, based on real-time kinematic feedback data 117, sign language presenter feedback screen 420 may display an arrow or other graphic showing how the signer could move and adjust their body pose (e.g., adjust their hand(s), finger(s), arm(s), torso, and/or facial expression) to better align the sign language symbol they are presenting with the intended sign language symbol. In some embodiments, the UI 410 may display visual correction feedback for a plurality of distinct keypoints, where out-of-tolerance (e.g., non-conforming) keypoints 442 are distinctly highlighted in real-time with indications 446 on how to improve their alignment. Moreover, in some embodiments, sign language presenter feedback screen 420 may present one or more textual instructions (shown at 422) providing guidance for pose adjustment to be applied by the speaker to bring the non-conforming keypoints 442 into conforming keypoints 444. In some embodiments, the sign language presenter feedback screen 420 may present the speaker's image (e.g., uplink content data feed 115) without modification, but present one or more of the non-conforming extracted keypoints 442, conforming extracted keypoints 444, and/or graphical cues 446, as a graphical overlay over, or adjacent to, the speaker's image. In some embodiments, the sign language presenter feedback screen 420 may comprise an augmented and/or extended reality presentation that displays a combination of generative AI hand pose modifications and a keypoint pattern overlay.

In some embodiments, the sign language presenter feedback screen 420 may augment the signer's image with an animated avatar 423 performing the signing and providing one or more of the textual instructions 422, non-conforming extracted keypoints 442, conforming extracted keypoints 444, and/or graphical cues 446.

As previously mentioned, in some embodiments, the communication platform 120 may comprise a cloud-based virtual reality space (e.g., a metaverse in which users represented by avatars may interact) or another virtual environment (e.g., NVIDIA Omniverse). As such, in some such embodiments, the sign language feedback framework 130 may produce sign language video data used by the platform to render avatars within such a virtual environment that may be signing using the sign language. In some embodiments, one or more aspects of the UI 107 and/or UI 410 may be implemented as an immersive augmented reality (AR)/virtual reality (VR) rendering by an HMI 106 comprising AR/VR goggles, glasses, or headset where each participant would see the avatar of the other participants with whom they are speaking and/or signing—where the individual renderings that the viewer experiences are presented as communicating in a sign language based on the viewer's sign language preferences.

Figure 5:
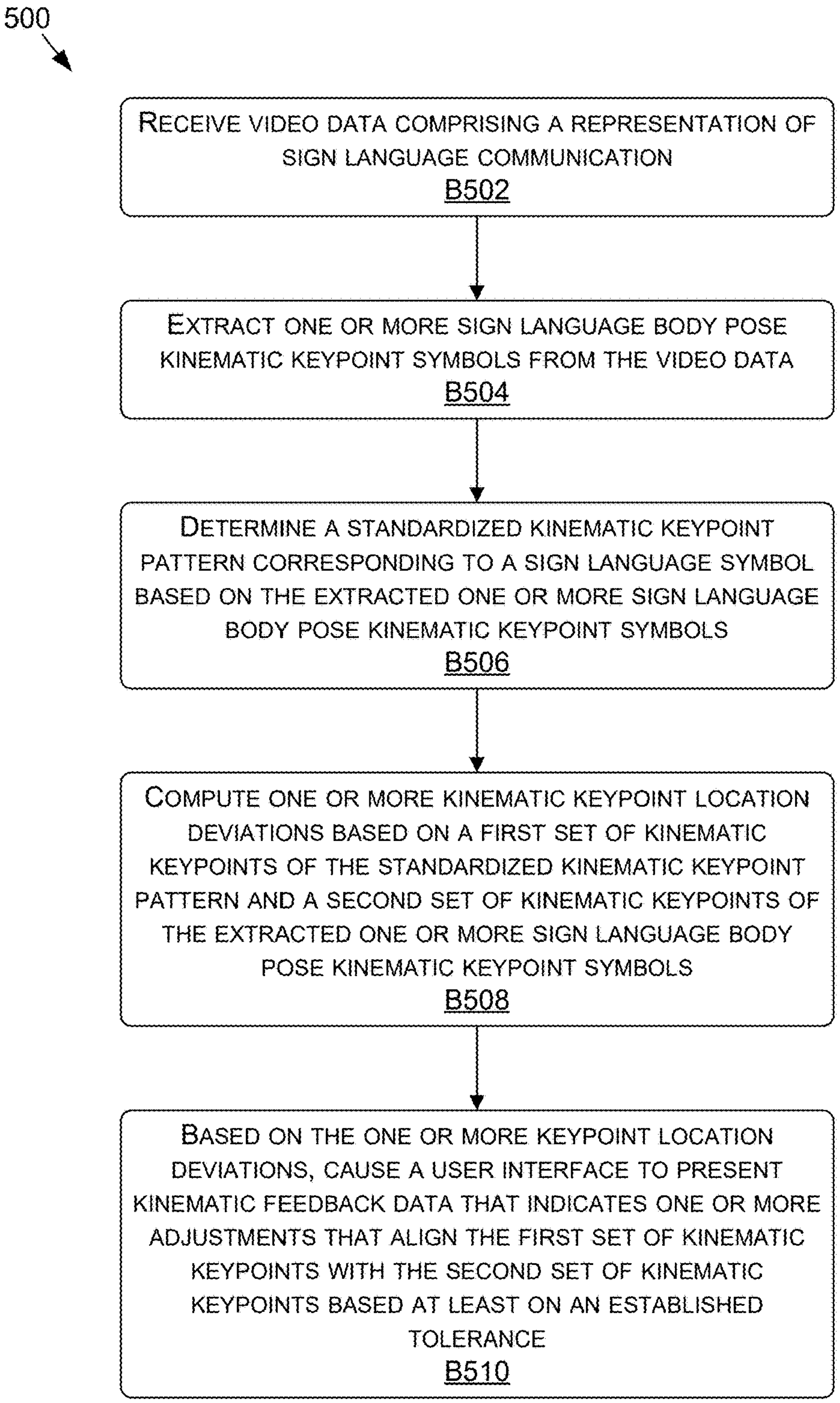
FIG. 5 is a flow chart illustrating an example method for providing sign language kinematic feedback, in accordance with some embodiments of the present disclosure.

FIG. 5 is a diagram illustrating a method for providing sign language kinematic feedback, in accordance with some embodiments of the present disclosure. It should be understood that the features and elements described herein with respect to the method 500 of FIG. 5 may be used in conjunction with, in combination with, or substituted for elements of any of the other embodiments discussed herein and vice versa. Further, it should be understood that the functions, structures, and other descriptions of elements for embodiments described in FIG. 5 may apply to like or similarly named or described elements across any of the figures and/or embodiments described herein and vice versa.

Each block of method 500, described herein, comprises a computing process that may be performed using any combination of hardware, firmware, and/or software. For instance, various functions may be carried out by one or more processors comprising processing circuitry and executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 500 is described, by way of example, with respect to the sign language-based communication system 100 of FIG. 1. However, these methods may additionally or alternatively be executed by any one system, or any combination of systems, including, but not limited to, those described herein.

As discussed herein in greater detail, the method may in general include generating an output comprising animated kinematic feedback data representing instructions for performing one or more pose adjustments, the one or more pose adjustments computed based on one or more keypoint location deviations between a standardized kinematic keypoint pattern and one or more extracted kinematic keypoint symbols extracted from video data comprising a representation of a human body pose.

The method 500, at block B502, includes receiving video data comprising a representation of sign language communication. In some embodiments, the client device 105 and/or HMI 106 may comprise one or more cameras 108 that capture image data of the user for uplink transmission to the communication platform 120 as uplink content data feed 115. The uplink content data feed 115 may comprise audio and/or video data captured from the user of user client application 110. That is, an uplink content data feed 115 may comprise communications content data that includes, amongst other data, video data representing sign language communications.

The method 500, at block B504, includes extracting one or more sign language body pose kinematic keypoint symbols from the video data. The one or more sign language body pose kinematic keypoint symbols comprise kinematic keypoints corresponding to at least one of skeletal bones or joints (e.g., body poses including hand shapes, curvatures and/or movements). As previously discussed, a sign language proficiency engine instance 134 may comprise one or more machine learning models trained to perform human body pose recognition, such as skeletal kinematic recognition that extracts the relative positions of predefined kinematic keypoints (e.g., skeletal bones and joints and/or other features) from images of an individual's hand(s), arm(s), face, and/or torso. The sign language proficiency engine instance 134 may detect and/or extract from the uplink content data feed 115 video data of the relative positions of predefined kinematic keypoints as exhibited by the signer to establish a two-dimensional kinematic keypoint symbol, such as is illustrated in FIG. 3A. In some embodiments, the method may execute a framework comprising one or more machine learning models that extract the one or more hand pose kinematic keypoint symbols from the video data.

The method 500, at block B506, includes determining a standardized kinematic keypoint pattern corresponding to a sign language symbol based on the extracted one or more sign language body pose kinematic keypoint symbols. The method may include executing a search of one or more body pose dictionaries based on the extracted one or more sign language body pose kinematic keypoint symbols to determine the standardized hand pose kinematic keypoint pattern. The one or more body pose dictionaries comprise one or more sign language-based body pose dictionaries based on one or more sign language versions. In some embodiments, the method may execute one or more retrieval-augmented generation (RAG) artificial intelligence models that access one or more data sources comprising the one or more body pose dictionaries. The method may include executing a framework comprising one or more machine learning models that generate the kinematic feedback data based at least on the video data and a sign language dictionary selected based at least on a sign language version indicated by the video data.

As discussed herein, a kinematic keypoint sign language symbol extracted from a captured human body pose may be used by the sign language proficiency engine instance 134 as a query to search a sign language dictionary 136 to find a corresponding standard version of the sign language symbol that may be used as a basis for comparison to the extracted kinematic keypoint symbol to produce the kinematic keypoint location deviation data. In some embodiments, the sign language proficiency engine instance 134 may perform the search of sign language dictionary 136 based on executing a similarity algorithm. For example, the similarity algorithm may select a kinematic keypoint pattern from the sign language dictionary 136 that has a similarity (e.g., within a similarity threshold) to the extracted kinematic keypoint symbol and define that as representing the signer's intended sign language symbol. Based on this determination of the intended sign language symbol from a sign language dictionary 136, the sign language proficiency engine instance 134 computes deviations between the kinematic keypoint pattern of the intended sign language symbol and the extracted kinematic keypoint symbol. In some embodiments, the similarity algorithm may incorporate the use of contextual information to search the sign language dictionary 136 to determine a signer's intended sign language symbol. For example, even where a sign language symbol may be defined based on a hand pose and/or torso pose, the similarity algorithm may leverage facial keypoints to classify a facial expression (e.g., happy, sad, angry, confused, etc.) to help in discerning the intended sign language symbol and its corresponding standardized kinematic keypoint pattern from the sign language dictionary 136.

The method 500, at block B508, includes computing one or more kinematic keypoint location deviations based on a first set of kinematic keypoints of the standardized kinematic keypoint pattern and a second set of kinematic keypoints of the extracted one or more sign language body pose kinematic keypoint symbols. For example, based on a determination of the intended sign language symbol from a sign language dictionary 136, the sign language proficiency engine instance 134 computes deviations between the kinematic keypoint pattern of the intended sign language symbol, and the extracted kinematic keypoint symbol. In some embodiments, the similarity algorithm may incorporate the use of contextual information to search the sign language dictionary 136 to determine a signer's intended sign language symbol. For example, even where a sign language symbol may be defined based on a hand pose and/or torso pose, the similarity algorithm may leverage facial keypoints to classify a facial expression (e.g., happy, sad, angry, confused, etc.) to help in discerning the intended sign language symbol and its corresponding standardized kinematic keypoint pattern from the sign language dictionary 136. The sign language proficiency engine instance 134 may then perform a kinematic keypoint deviation analysis 340 to generate keypoint location deviation data 350. The keypoint location deviation data 350 may represent deviations in the location of keypoints in the extracted kinematic keypoint symbol 322 relative to where the keypoint locations should be located to produce the intended sign language symbol according to the one or more sign language dictionaries 136. In some embodiments, minor deviations (e.g., deviations less than a deviation threshold) may be disregarded. Those extracted keypoint locations that are offset from the standard keypoint locations (e.g., by more than the deviation threshold) may be indicated in deviation data 350. For example, the sign language proficiency engine instance 134 may determine bounding shapes (e.g., bounding boxes) around detected keypoints and compute variations to determine when keypoints extracted from the video data are deviating beyond an established tolerance.

The method 500, at block B510, includes, based on the one or more keypoint location deviations, causing (e.g., controlling) a user interface to present kinematic feedback data that indicates one or more adjustments that align the first set of kinematic keypoints with the second set of kinematic keypoints based at least on an established tolerance. The kinematic feedback data may include an animated kinematic keypoint pattern comprising at least one indication of a body pose adjustment for aligning the one or more sign language body pose kinematic keypoint symbols with the standardized kinematic keypoint pattern. In some embodiments, the animated kinematic keypoint pattern includes one or more visual indications of out-of-tolerance kinematic keypoint locations. The kinematic feedback data, in some embodiments, may comprise a modification to the video data to alter a signer's hand pose to illustrate one or more deviations between the standardized hand pose kinematic keypoint pattern and the extracted one or more sign language body pose kinematic keypoint symbols.

As discussed herein, the keypoint location deviation data 350 may include a spatial representation of conforming versus non-conforming keypoint locations and/or may include adjustment data representing adjustments that may be made to bring non-conforming keypoints to their correct locations as defined by the one or more sign language dictionaries 136. The deviation data 350 may further indicate what adjustment needs to be applied to non-conforming keypoints to properly align them with the standard kinematic keypoint pattern 330. Moreover, in the embodiments, the sign language proficiency engine instance 134 may generate and include in deviation data 350 one or more textual instructions indicating what pose adjustment needs to be applied by the speaker to bring the non-conforming keypoints into conformance. The kinematic feedback data 117 may be used by the user client application 110 to present a visual representation of the keypoint location deviation data 350 onto the UI 107. The augmentation manager 132 may generate animated kinematic feedback (e.g., real-time and/or near real-time animated visual feedback) to the signer by presenting, for example, a kinematic keypoint pattern overlay or similar graphic that highlights kinematic keypoints that deviate in position from the dictionary-defined kinematic keypoint pattern by more than a threshold amount. The kinematic feedback data 117 may include a correction (e.g., a direction and/or distance) indicating how an out-of-tolerance keypoint should be adjusted to align the signer's hand pose into a more correct representation of the intended sign language symbol. For example, based on real-time kinematic feedback data 117, the user client application 110 may control the UI 107 to display an arrow or other graphic showing how the signer could move and adjust their body pose (e.g., adjust their hand(s), finger(s), arm(s), torso, and/or facial expression) to better align the sign language symbol they are presenting with the intended sign language symbol. In some embodiments, the UI 107 may display visual correction feedback for a plurality of distinct keypoints, where out-of-tolerance keypoints are distinctly highlighted in real-time with indications on how to improve their alignment.

In some embodiments, the method may control one or more robotic peripherals based at least on the kinematic feedback data. For example, in some embodiments, the user client application 110 may use the kinematic feedback data 117 to control one or more training peripherals 109 in addition to, or instead of, UI 107. For example, a training peripheral 109 (e.g., coupled to or integrated with the client device 105) may comprise a robotic hand responsive to controls from the user client application 110 based on the kinematic feedback data 117 so that the robotic hand is able to provide the standard for correct signing.

In some embodiments, a machine (e.g., a robot or ego machine) may be trained to communicate in sign language based at least on the kinematic feedback data. For example, in some embodiments, client device 105 may comprise an artificial intelligence (AI)-based user that learns to communicate in sign language based on the kinematic feedback data 117.

In some embodiments, the method may control a multiuser virtual environment to render one or more avatars within the multiuser virtual environment to present the communications content data based at least on the sign language video data. As previously mentioned, the communication platform 120 may comprise a cloud-based collaborative content creation platform such as, but not limited to, NVIDIA Omniverse, or other augmented reality (AR)/virtual reality (VR)/mixed reality (MR) multiuser virtual environments (e.g., a metaverse). In some such embodiments, the sign language feedback framework 130 may produce sign language video data used by the platform to render avatars within the virtual environment that may be signing using the sign language represented by the sign language video data. A UI 107 may be implemented as an immersive AR/VR/MR rendering by an HMI 106 comprising AR/VR/MR goggles, glasses, or headset where each participant would see the avatar of the other participants with whom they are speaking and/or signing—where the individual renderings that the viewer experiences are presented as communicating in a sign language based on the viewer's sign language preferences.

In some embodiments, the systems and methods described herein may be performed within, or in conjunction with, a simulation environment (e.g., NVIDIA's DriveSIM, NVIDIA's Omniverse, etc.) using simulated data (e.g., simulated sensor data of simulated sensors of a virtual or simulated machine). For example, sign language data may be used to perform operations (e.g., navigation, communication, etc.) associated with virtual machines and/or participants within the environment. In some embodiments, the simulation environment and/or one or more objects, features, or components thereof may be generated or managed within a three-dimensional (3D) content collaboration platform (e.g., NVIDIA's Omniverse) for industrial digitalization, generative physical artificial intelligence (AI), and/or other use cases, applications, or services. For example, the content collaboration platform or system may include a system for using or developing a universal scene descriptor (USD) (e.g., OpenUSD) data for managing objects, features, scenes, etc., within a simulated environment, digital environment, etc. The platform may include real physics simulation, such as using NVIDIA's PhysX SDK, in order to simulate real physics and physical interactions with simulations hosted by the platform. The platform may integrate OpenUSD along with ray tracing/path tracing/light transport simulation (e.g., NVIDIA's RTX rendering technologies) into software tools and simulation workflows for building, training, deploying, or testing AI systems-such as systems for testing, validating, training (e.g., machine learning models, neural networks, etc.), and/or other tasks related to automotive, robot, machine, or other applications.

In some embodiments, the system and methods described herein may be deployed in an in-vehicle infotainment (IVI) system or in-cabin experience (IX) application. For example, the infotainment system within a vehicle (e.g., cars, trucks, drones, construction equipment, robots, semi-autonomous vehicles, or autonomous vehicles) may include one or more onboard processors (e.g., central processing units (CPUs), graphics processing units (GPUs), hardware-based deep learning accelerators (DLAs), hardware-based programmable vision accelerators (PVAs)—which may include one or more vector processing units (VPUs), direct memory access (DMA) systems, and/or pixel processing engines (PPEs), hardware-based optical flow accelerators (OFAs, SoCs, etc.), memory and/or storage (e.g., for storing control algorithms, sensor data, and one or more machine learning models), and memory and/or storage (e.g., for storing entertainment content, navigation data, and user preferences). The system may use these processors to execute one or more machine learning models to enable features such as occupant monitoring, gesture recognition, and real-time communication with other services through network connectivity. The in-vehicle infotainment system may also use natural language processing (NLP) models to enable voice-based interaction and/or sign language-based interactions. The one or more machine learning models may be stored locally or accessed through one or more APIs that connect to cloud services, enabling the system to process requests in real-time or near real-time.

In some embodiments, the system and methods described herein may be deployed in a robotics application. For example, a robot or robotic system may include one or more onboard processors (e.g., CPUs, GPUs, hardware-based deep learning accelerators (DLAs), hardware-based programmable vision accelerators (PVAs)—which may include one or more vector processing units (VPUs), direct memory access (DMA) systems, and/or pixel processing engines (PPEs), hardware-based optical flow accelerators (OFAs), SoCs, etc.) and memory and/or storage (e.g., for storing control algorithms, sensor data, and one or more machine learning models). The robotic system may use these processors to execute one or more machine learning models (e.g., language models) that allow it to perform complex tasks autonomously or semi-autonomously, such as interacting with and/or manipulating static and/or dynamic objects, or navigating environments using sensors such as cameras, LiDAR, RADAR, ultrasonic sensors, and more. The system may use sensor fusion techniques to combine data from multiple sensors (e.g., cameras, infrared, LiDAR, RADAR, accelerometers, etc.) to create a comprehensive model of the robot's surroundings. This data may be processed locally on the robot or sent to remote servers for more computationally intensive tasks, such as 3D mapping or SLAM (Simultaneous Localization and Mapping). In one or more embodiments, data from individual robots (e.g., sensor data, task status, or environmental conditions) may be uploaded to the cloud, where centralized AI models can analyze and distribute optimized commands to an entire fleet. In some embodiments, the machine learning model(s) (e.g., language models, vision language models (VLMs), large language models (LLMs), small language models (SLMs), multimodal language models (MMLMs), diffusion models, neural radiance fields (NeRF) models, DNNs, etc.) described herein may be used to allow the robot to perceive and reason about the environment and/or communicate with one or more other robots and/or persons in an environment. In some embodiments, the robot may communicate (e.g., using one or more network interface cards (NICs) and/or data processing units (DPUs)) with one or more locally hosted servers/computing devices and/or with one or more remotely located servers/computing devices (e.g., in one or more data centers).

In some examples, the machine learning model(s) (e.g., deep neural networks, language models, LLMs, SLMs, VLMs, multimodal language models, perception models, tracking models, fusion models, transformer models, diffusion models, encoder-only models, decoder-only models, encoder-decoder models, neural radiance field (NeRF) models, etc.) described herein may be packaged as one or more cloud-hosted microservices—such as an inference microservice (e.g., NVIDIA NIMs)—which may include a container (e.g., an operating system (OS-level virtualization package) that may include an application programming interface (API) layer, a server layer, a runtime layer, and/or a model "engine." For example, the inference microservice may include the container itself and the model(s) (e.g., weights and biases). In some instances, such as where the machine learning model(s) is small enough (e.g., has a small enough number of parameters), the model(s) may be included within the container itself. In other examples—such as where the model(s) is large—the model(s) may be hosted/stored in the cloud (e.g., in a data center) and/or may be hosted on-premises and/or at the edge (e.g., on a local server or computing device, but outside of the container). In such embodiments, the model(s) may be accessible via one or more APIs-such as representational state transfer (REST) APIs. As such, and in some embodiments, the machine learning model(s) described herein may be deployed as an inference microservice to accelerate deployment of a model(s) on any cloud, data center, or edge computing system, while ensuring the data is secure. For example, the inference microservice may include one or more APIs, a preconfigured container for simplified deployment, an optimized inference engine (e.g., built using a standardized AI model deployment and execution software, such as NVIDIA's Triton Inference Server, and/or one or more APIs for high-performance deep learning inference, which may include an inference runtime and model optimizations that deliver low latency and high throughput for production applications—such as NVIDIA's TensorRT), and/or enterprise management data for telemetry (e.g., including identity, metrics, health checks, and/or monitoring). The machine learning model(s) described herein may be included as part of the microservice along with an accelerated infrastructure with the ability to deploy with a single command and/or orchestrate and auto-scale with a container orchestration system on accelerated infrastructure (e.g., on a single device up to data center scale). As such, the inference microservice may include the machine learning model(s) (e.g., that has been optimized for high-performance inference), an inference runtime software to execute the machine learning model(s) and provide outputs/responses to inputs (e.g., user queries, prompts, etc.), and enterprise management software to provide health checks, identity, and/or other monitoring. In some embodiments, the inference microservice may include software to perform in-place replacement and/or updating to the machine learning model (s). When replacing or updating, the software that performs the replacement/updating may maintain user configurations of the inference runtime software and enterprise management software.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing, generative AI, and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems implementing one or more language models-such as one or more large language models (LLMs), one or more small language models (SLMs), one or more vision language models (VLMs), one or more multimodal language models (MMLMs), systems for performing light transport simulation, systems for performing collaborative content creation for 3D assets, systems implemented at least partially using cloud computing resources, and/or other types of systems.

Example Computing Device

Figure 6:
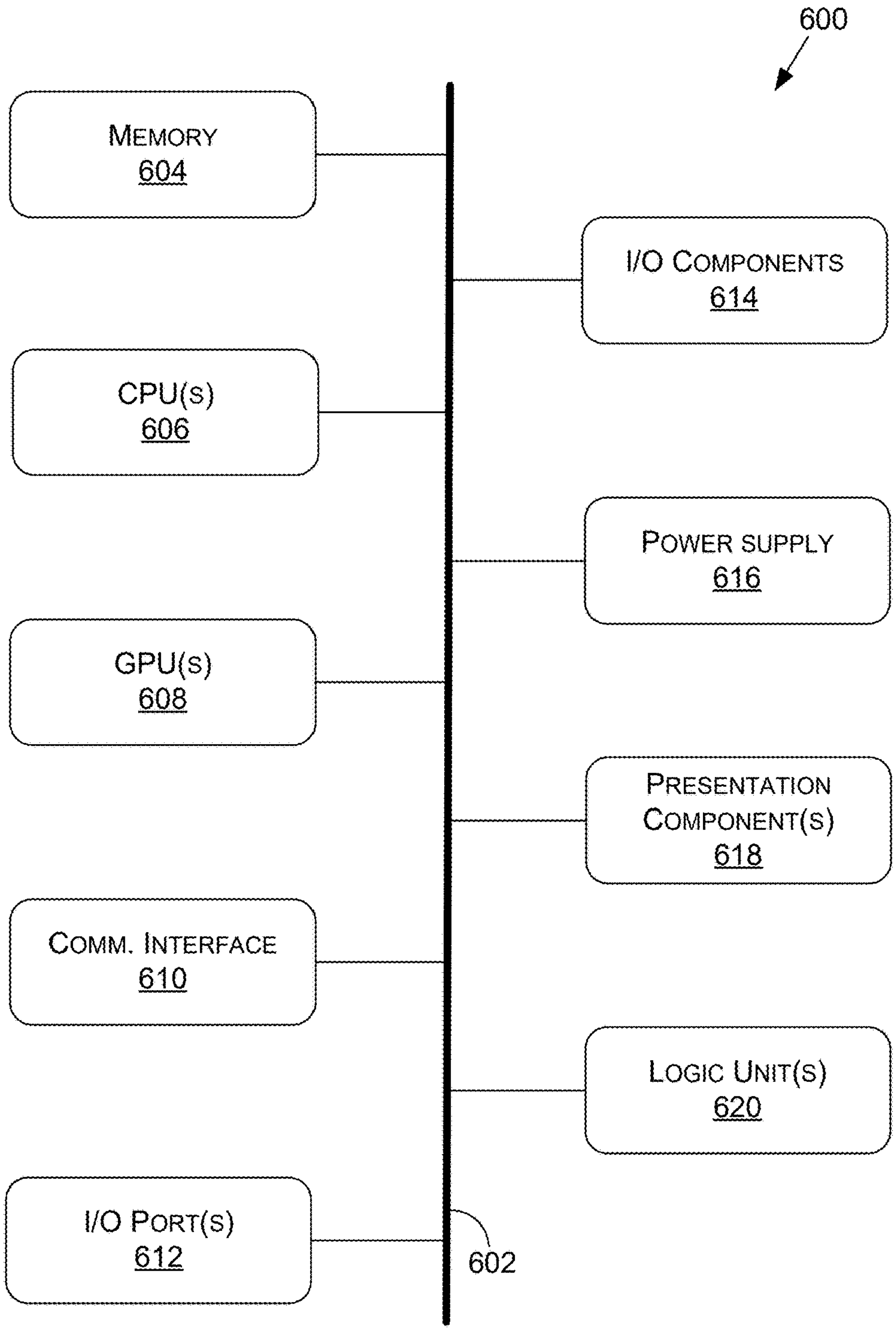
FIG. 6 is a block diagram of an example computing device suitable for use in implementing some embodiments of the present disclosure.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620. In at least one embodiment, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units. As such, a computing device(s) 600 may include discrete components (e.g., a full GPU dedicated to the computing device 600), virtual components (e.g., a portion of a GPU dedicated to the computing device 600), or a combination thereof. In some embodiments, one or more functions of the user client application 110, HMI 106, UI 107 and/or sign language feedback framework 130 described herein may be implemented at least in part using computing device(s) 600.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). As such, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

In some embodiments, one or more functions of the user client application 110, HMI 106, UI 107 and/or sign language feedback framework 130 described herein may be implemented at least in part using CPU(s) 606, GPU(s) 608 and/or logic unit(s) 620. For example one or more machine learning models of the sign language feedback framework 130 may comprise neural networks executing on one or more of the GPU(s) 608 to perform functions of the sign language detection model 224, the sign language proficiency engine 134, and/or the augmentation manager 132.

Examples of the logic unit(s) 620 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that allow the computing device 600 to communicate with other computing devices via an electronic communication network, included wired and/or wireless communications. The communication interface 610 may include components and functionality to allow communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 620 and/or communication interface 610 may include one or more data processing units (DPUs) to transmit data received over a network and/or through interconnect system 602 directly to (e.g., a memory of) one or more GPU(s) 608.

The I/O ports 612 may allow the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that allow detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to allow the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, DPUs, etc.), and output the data (e.g., as an image, video, sound, etc.). In some embodiments, HMI 106 may comprise one or more of the presentation component(s) 618 and/or the UI 107 described herein displayed via the one or more presentation component(s) 618.

Example Data Center

Figure 7:
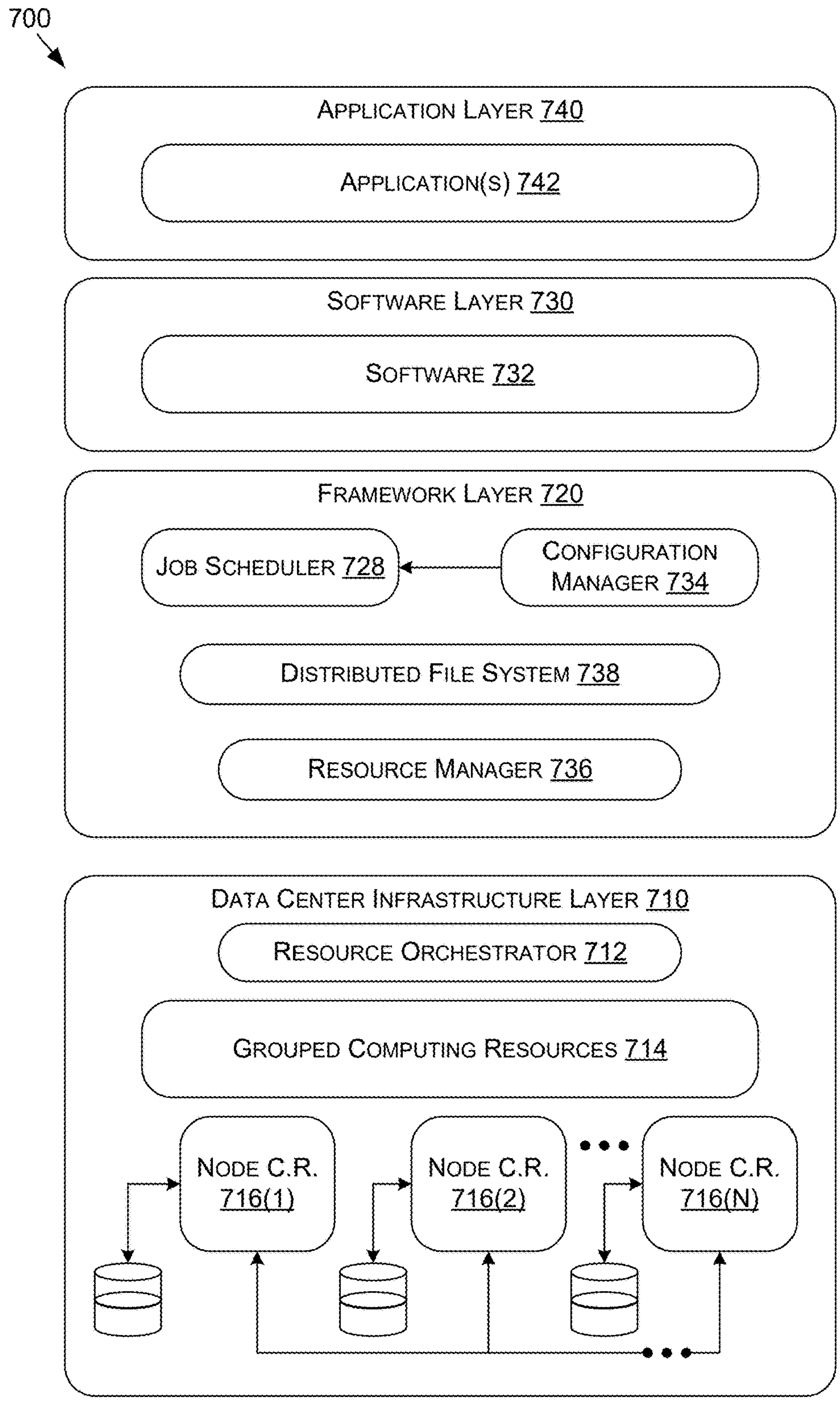
FIG. 7 is a block diagram of an example data center suitable for use in implementing some embodiments of the present disclosure.

FIG. 7 illustrates an example data center 700 that may be used in at least one embodiments of the present disclosure. The data center 700 may include a data center infrastructure layer 710, a framework layer 720, a software layer 730, and/or an application layer 740. In some embodiments, one or more functions of the sign language feedback framework 130 described herein may be implemented at least in part using data center 700.

As shown in FIG. 7, the data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 716(1)-716(N) may correspond to a server having one or more of the above-mentioned computing resources. In addition, in some embodiments, the node C.R.s 716(1)-7161(N) may include one or more virtual components, such as vGPUs, vCPUs, and/or the like, and/or one or more of the node C.R.s 716(1)-716(N) may correspond to a virtual machine (VM). In some embodiments, one or more functions of the sign language feedback framework 130 described herein may be implemented at least in part using one or more of the node C.R.s 716(1)-716(N). For example, one or more machine learning models of the sign language feedback framework 130 may comprise neural networks executing on one or more of the node C.R.s 716(1)-316(N) to perform functions of the sign language detection model 224, the sign language proficiency engine 134, and/or the augmentation manager 132.

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 712 may configure or otherwise control one or more node C.R.s 716(1)-716(N) and/or grouped computing resources 714. In at least one embodiment, resource orchestrator 712 may include a software design infrastructure (SDI) management entity for the data center 700. The resource orchestrator 712 may include hardware, software, or some combination thereof.

In some embodiments, one or more functions of the sign language feedback framework 130 described herein may be hosted by data center 700 and available to user client application 110 and/or communication platform 120 as a network service.

In at least one embodiment, as shown in FIG. 7, framework layer 720 may include a job scheduler 728, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may use distributed file system 738 for large-scale data processing (e.g., "big data"). In at least one embodiment, job scheduler 728 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 728. In at least one embodiment, clustered or grouped computing resources may include grouped computing resource 714 at data center infrastructure layer 710. The resource manager 736 may coordinate with resource orchestrator 712 to manage these mapped or allocated computing resources. In some embodiments, application(s) 742 and/or software 732 may at least in part comprise code that when executed perform one or more functions of the sign language feedback framework 130 described herein.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or perform inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. One or more processors comprising processing circuitry to:

receive video data comprising a representation of sign language communication;

extract one or more sign language body pose kinematic keypoint symbols from the video data;

select a standardized kinematic keypoint pattern corresponding to a sign language symbol based at least on a similarity to the extracted one or more sign language body pose kinematic keypoint symbols;

compute one or more kinematic keypoint location deviations between a first set of kinematic keypoints of the standardized kinematic keypoint pattern and a second set of kinematic keypoints of the extracted one or more sign language body pose kinematic keypoint symbols; and based at least on the one or more kinematic keypoint location deviations, cause a user interface to present kinematic feedback data that indicates one or more adjustments to align the second set of kinematic keypoints with the first set of kinematic keypoints within an established tolerance.

2. The one or more processors of claim 1, wherein the one or more sign language body pose kinematic keypoint symbols comprise kinematic keypoints corresponding to at least one of skeletal bones or joints.

3. The one or more processors of claim 1, wherein the one or more processors are further to:

generate the kinematic feedback data to include an animated kinematic keypoint pattern comprising at least one indication of at least a portion of a body pose adjustment for aligning the one or more sign language body pose kinematic keypoint symbols with the standardized kinematic keypoint pattern.

4. The one or more processors of claim 3, wherein the one or more processors are further to:

generate the animated kinematic keypoint pattern to include one or more visual indications of out-of-tolerance kinematic keypoint locations.

5. The one or more processors of claim 1, wherein the one or more processors are further to:

control one or more robotic peripherals based at least on the kinematic feedback data.

6. The one or more processors of claim 1, wherein the one or more processors are further to:

train a machine to communicate in sign language based at least on the kinematic feedback data.

7. The one or more processors of claim 1, wherein the one or more processors are further to:

generate the kinematic feedback data based at least on a modification to the video data to alter a signer's hand pose to illustrate one or more deviations between the standardized kinematic keypoint pattern and the extracted one or more sign language body pose kinematic keypoint symbols.

8. The one or more processors of claim 1, wherein the one or more processors are further to:

execute a search of one or more body pose dictionaries based at least on the extracted one or more sign language body pose kinematic keypoint symbols to determine the standardized kinematic keypoint pattern.

9. The one or more processors of claim 8, wherein the one or more body pose dictionaries comprises one or more sign language-based body pose dictionaries based at least on one or more sign language versions.

10. The one or more processors of claim 8, wherein the one or more processors are further to:

execute one or more retrieval-augmented generation (RAG) artificial intelligence models that access one or more data sources comprising the one or more body pose dictionaries.

11. The one or more processors of claim 1, wherein the one or more processors are further to:

execute a framework comprising one or more machine learning models that extract the one or more sign language body pose kinematic keypoint symbols from the video data.

12. The one or more processors of claim 1, wherein the one or more processors are further to:

execute a framework comprising one or more machine learning models that generate the kinematic feedback data based at least on the video data and a sign language dictionary selected based at least on a sign language version indicated by the video data.

13. The one or more processors of claim 1, wherein the processing circuitry is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for three-dimensional assets;

a system for performing deep learning operations;

a system for performing remote operations;

a system for performing real-time streaming;

a system for generating or presenting one or more of augmented reality content, virtual reality content, or mixed reality content;

a system implemented using an edge device;

a system for generating or presenting virtual reality (VR) content;

a system for generating or presenting augmented reality (AR) content;

a system for generating or presenting mixed reality (MR) content;

a system implemented using a robot;

a system for performing conversational AI operations;

a system implementing one or more language models;

a system implementing one or more small language models (SLMs);

a system implementing one or more tiny language models (TLMs);

a system implementing one or more large language models (LLMs);

a system implementing one or more vision language models (VLMs);

a system implementing one or more multimodal language models (MMLMs);

a system for generating synthetic data;

a system for generating synthetic data using AI;

a system incorporating one or more virtual machines (VMs);

a system implemented at least partially in a data center; or a system implemented at least partially using cloud computing resources.

14. A system comprising one or more processors to:

extract one or more kinematic keypoint symbols from video data comprising a representation of a human body pose;

select a standardized kinematic keypoint pattern based at least on a similarity to the one or more extracted kinematic keypoint symbols;

compute one or more keypoint location deviations between a first set of kinematic keypoints of the standardized kinematic keypoint pattern and a second set of kinematic keypoints of the one or more extracted kinematic keypoint symbols;

compute one or more body pose adjustments to the one or more extracted kinematic keypoint symbols, wherein the one or more body pose adjustments are computed to reduce the one or more keypoint location deviations to within an established tolerance; and provide, to a user interface, an output comprising kinematic feedback data representing instructions for performing the one or more body pose adjustments to align the second set of kinematic keypoints with the first set of kinematic keypoints within the established tolerance.

15. The system of claim 14, the one or more processors further to:

control the user interface to output a representation of the kinematic feedback data in response to receiving the video data via the user interface.

16. The system of claim 14, the one or more processors further to:

generate the kinematic feedback data to include an animated kinematic keypoint pattern comprising at least one indication of a body pose adjustment for aligning the one or more extracted kinematic keypoint symbols with the standardized kinematic keypoint pattern.

17. The system of claim 14, the one or more processors further to:

generate the kinematic feedback data based at least on a modification to the video data to alter a hand pose to illustrate one or more deviations between the standardized kinematic keypoint pattern and the one or more extracted kinematic keypoint symbols.

18. The system of claim 14, the one or more processors further to:

execute a search of one or more body pose dictionaries based at least on the one or more extracted kinematic keypoint symbols to determine the standardized kinematic keypoint pattern.

19. The system of claim 14, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for three-dimensional assets;

a system for performing deep learning operations;

a system for performing remote operations;

a system for performing real-time streaming;

a system for generating or presenting one or more of augmented reality content, virtual reality content, or mixed reality content;

a system implemented using an edge device;

a system for generating or presenting virtual reality (VR) content;

a system for generating or presenting augmented reality (AR) content;

a system for generating or presenting mixed reality (MR) content;

a system implemented using a robot;

a system for performing conversational AI operations;

a system implementing one or more language models;

a system implementing one or more small language models (SLMs);

a system implementing one or more tiny language models (TLMs);

a system implementing one or more large language models (LLMs);

a system implementing one or more vision language models (VLMs);

a system implementing one or more multimodal language models (MMLMs);

a system for generating synthetic data;

a system for generating synthetic data using AI;

a system incorporating one or more virtual machines (VMs);

a system implemented at least partially in a data center; or a system implemented at least partially using cloud computing resources.

20. A method comprising:

generating an output comprising animated kinematic feedback data representing instructions for performing one or more pose adjustments, the one or more pose adjustments computed to reduce one or more keypoint location deviations between a first set of keypoints of a standardized kinematic keypoint pattern and a second set of keypoints of one or more extracted kinematic keypoint symbols extracted from video data comprising a representation of a human body pose to within an established tolerance, the standardized kinematic keypoint pattern selected based at least on a similarity to the one or more extracted kinematic keypoint symbols; and controlling a user interface to present the animated kinematic feedback data representing instructions for performing one or more pose adjustments to align the second set of keypoints with the first set of keypoints within the established tolerance.

* * * * *